US008731311B2

(12) United States Patent
Ohmiya et al.

(10) Patent No.: US 8,731,311 B2
(45) Date of Patent: May 20, 2014

(54) DECODING DEVICE, DECODING METHOD, DECODING PROGRAM, AND INTEGRATED CIRCUIT

(75) Inventors: Jun Ohmiya, Kyoto (JP); Akio Nishimura, Osaka (JP); Tadashi Kobayashi, Osaka (JP); Yoshiyuki Mochizuki, Osaka (JP)

(73) Assignee: Panasonic Corporation, Osaka (JP)

(*) Notice: Subject to any disclaimer, the term of this patent is extended or adjusted under 35 U.S.C. 154(b) by 1040 days.

(21) Appl. No.: 12/440,806

(22) PCT Filed: Sep. 11, 2007

(86) PCT No.: PCT/JP2007/067635
§ 371 (c)(1),
(2), (4) Date: Mar. 11, 2009

(87) PCT Pub. No.: WO2008/038513
PCT Pub. Date: Apr. 3, 2008

(65) Prior Publication Data
US 2009/0279801 A1 Nov. 12, 2009

(30) Foreign Application Priority Data
Sep. 26, 2006 (JP) ................................ 2006-260257

(51) Int. Cl.
*G06K 9/36* (2006.01)

(52) U.S. Cl.
USPC ........................................................ 382/233

(58) Field of Classification Search
CPC ............................................... H04N 19/00484
USPC ......................................... 382/235, 233, 238
See application file for complete search history.

(56) References Cited

U.S. PATENT DOCUMENTS 5,148,272 A * 9/1992 Acampora et al. ......... 375/240.1
6,026,217 A * 2/2000 Adiletta ....................... 709/247

(Continued)

FOREIGN PATENT DOCUMENTS

JP 11-289536 10/1999
JP 2000-175201 6/2000

(Continued)

OTHER PUBLICATIONS

"Advanced Video Recording for Generic Audiovisual Services," International Telecommunication Union, ITU-T Rec. H.264, Nov. 2007.

(Continued)

*Primary Examiner* — Matthew Bella
*Assistant Examiner* — Dennis Rosario
(74) *Attorney, Agent, or Firm* — Wenderoth, Lind & Ponack, L.L.P.

(57) ABSTRACT

A decoding device improves a cache hit rate in a decoding process of compressed encoded image data. The decoding device, before the decoding process, generates a sort table for each reference picture for a plurality of MPEG data streams included in a GOP and having a frame type of P- or B-picture. The decoding device, by using the generated sort table, selects a group of pictures composed of a plurality of decoding target macro blocks that refer to the same reference macro block. The decoding device obtains, from the reference picture, four macro blocks including the same reference macro block referred to by the selected picture group, and stores the four macro blocks into the cache memory. The decoding device sequentially decodes each decoding target macro block included in the selected picture group, by using the four macro blocks stored in the cache memory.

14 Claims, 14 Drawing Sheets

(56) References Cited

U.S. PATENT DOCUMENTS

| | | | | |
|---|---|---|---|---|
| 6,320,908 | B1 | 11/2001 | Ikekawa | |
| 6,687,298 | B1 | 2/2004 | Ikekawa | |
| 7,400,681 | B2 * | 7/2008 | Joch et al. | 375/240.16 |
| 7,492,387 | B2 * | 2/2009 | Yang et al. | 348/14.09 |
| 7,627,227 | B2 * | 12/2009 | Evans et al. | 386/347 |
| 8,432,972 | B2 * | 4/2013 | Jeon et al. | 375/240.16 |
| 2005/0047510 | A1 | 3/2005 | Yamaguchi et al. | |
| 2006/0294171 | A1 * | 12/2006 | Bossen et al. | 708/300 |
| 2007/0199011 | A1 * | 8/2007 | Zhang et al. | 725/1 |

FOREIGN PATENT DOCUMENTS

| | | |
|---|---|---|
| JP | 2000-278693 | 10/2000 |
| JP | 2004-297528 | 10/2004 |
| JP | 2005-102144 | 4/2005 |
| WO | 2005/084032 | 9/2005 |

OTHER PUBLICATIONS

International Search Report issued Dec. 11, 2007 in the International (PCT) Application of which the present application is the U.S. National Stage.

"Advanced Video coding for Generic Audiovisual Services," International Telecommunication Union, ITU-T Rec. H.264, Nov. 2007.

S. Okubo et al., H.264/AVC Textbook, Impress Co., Ltd., Jan. 2006. (With partial translation).

* cited by examiner

| MB number | X coordinate | Y coordinate |
|---|---|---|
| 0 | 1.5 | 2.5 |
| 1 | 17.0 | 3.0 |
| 2 | 30.5 | 1.5 |
| ⋮ | ⋮ | ⋮ |
| n | — | — |
| n+1 | … | … |
| ⋮ | ⋮ | ⋮ |

| MB number | Index information | Data start position information |
|---|---|---|
| 0 | P1_0 | Start position A0 |
| 1 | P1_1 | Start position A1 |
| 2 | P1_2 | Start position A2 |
| ⋮ | ⋮ | ⋮ |

| Reference picture | X coordinate | Y coordinate | Decoding picture | Decoding target MB | Index information | |
|---|---|---|---|---|---|---|
| I1 | 1.5 | 2.5 | P1 | 0,0 | P1_0 | T301 |
| I1 | 0.5 | 3.0 | B1 | 0,1 | B1_q1 | T302 |
| I1 | 11 | 13 | B2 | 1,0 | B2_r1 | T303 |
| I1 | 17 | 0 | P1 | 1,0 | P1_1 | T304 |
| I1 | 17.5 | 5.0 | B1 | 0,2 | B1_q2 | |
| I1 | 30.5 | 1.5 | P1 | 2,0 | P1_2 | |
| ⋮ | ⋮ | ⋮ | ⋮ | ⋮ | ⋮ | |

DECODING DEVICE, DECODING METHOD, DECODING PROGRAM, AND INTEGRATED CIRCUIT

BACKGROUND OF THE INVENTION

1. Technical Field

The present invention relates to a technology for decoding compress-encoded moving image data, and especially to a technology for improving memory access efficiency when a processing unit having a cache mechanism processes signals.

2. Background Art

As a method for compressing the data amount of moving image data for recording or transmission thereof, an international standard called MPEG (Moving Picture coding Experts Group) is widely prevalent. The MPEG family includes MPEG-1, MPEG-2, and MPEG-4. MPEG-1 has been widespread as a moving image encoding standard for CD (Compact Disc). MPEG-2 supports digital TV and DVD (Digital Versatile Disc). MPEG-4 adopts a lower bit rate on the assumption that it is used in the Internet or mobile communications. Also, in recent years, H.264/AVC (Advanced Video Coding) has been established for further improvement of the compression rate, and machines using this are increasing.

To decode image data having been compressed in compliance with such an MPEG standard, an enormous amount of calculation is required. For this reason, it was typical for machines conforming to an MPEG of earlier days to use a dedicated hardware device to decode MPEG-compressed data while maintaining the real-timeness. However, due to development of the technology of calculators in recent years, it has become possible to decode in real time only by software, without using a dedicated hardware device. As the dedicated hardware has become unnecessary, more varieties of machines have become possible to use MPEG data, and it is expected that the tendency will increase.

The decoding algorithm of MPEG is composed of four processes: a variable length encoding/decoding process called VLD (Variable Length Decoding); an inverse quantization process; an inverse DCT (Discrete Cosine Transform) process; and a motion compensation process. The above-mentioned MPEG-1, MPEG-2, MPEG-4, and H.264/AVC use almost the same algorithm with sight differences.

A system for decoding MPEG data generally includes an external storage device such as HDD or CD/DVD, a main memory, a CPU, and a display device. The external storage device stores MPEG data. The CPU reads out the MPEG data from the external storage device, and stores the read-out MPEG data into the main memory temporarily. The CPU decodes the MPEG data stored in the main memory by using a decoding process program that operates at the CPU, and stores image data resulted from the decoding into the main memory again. The CPU then reads out the image data from the main memory, performs a format conversion onto the image data so that the display device can display the image data, and transfers the conversion result to the display device. The display device displays images of the received image data.

FIG. 14 shows picture (namely, image data) arrangement when pictures are decoded by an MPEG method. The MPEG defines three types of pictures: I-picture being a picture that can be decoded only from information contained in the picture itself, without performing the motion compensation; P-picture that requires a motion compensation process in which a predictive decoding process of the target picture is performed using backward picture information; and B-picture that requires a predictive decoding process of the target picture using both forward and backward picture information.

FIG. 14A shows an arrangement of pictures stored in the external storage device. The number assigned to each picture indicates its place in the arrangement. The picture type of each picture is indicated below each picture. In FIG. 14A, picture 1 is an I-picture, and thus it can be decoded without information of other pictures. Pictures 2 and 3 are B-pictures, and thus need to be decoded using information of both pictures 1 and 4. B-pictures are not used in predictive processes for the other pictures. Picture 4 is a P-picture, and thus needs to be decoded using information of picture 1. Similarly, pictures 5 and 6 are decoded using information of pictures 4 and 7, and picture 7 is decoded using information of picture 4.

FIG. 14B shows a decoding process order in accordance with the picture types and the decoding order described above. In the actual decoding process, first, picture 1 of I-picture is decoded. Next, picture 4 of P-picture is decoded using the image data of decoded picture 1. Then, pictures 2 and 3 of B-pictures are decoded in sequence using the image data of decoded pictures 1 and 4. Picture 6 and after are decoded in a similar manner. Namely, after a P-picture is decoded, a B-picture is decoded. The decoding order should be the same as the compression process order defined in MPEG.

FIG. 14C shows an order in which images, having been obtained by the decoding, are displayed.

In the MPEG decoding process, access to the main memory occur frequently. Typically, in the above-described system, the CPU is provided with a cache memory in order to reduce the access load to the main memory. The cache memory has less capacity than the main memory, which is located outside the CPU and connected with the CPU, but is designed to be accessible at an extremely high speed.

For example, to decode the picture 4 of P-picture shown in FIG. 14B, the CPU obtains, from the picture 1 of I-picture, macro blocks (typically four macro blocks) that are to be referred to in the decoding process, using a motion vector that is included in the decoding target macro block to be decoded, and stores the obtained macro blocks into the cache memory. The CPU then decodes the decoding target macro block using the stored macro blocks. The CPU then obtains the next decoding target macro block, obtains, from the picture 1 of I-picture, macro blocks (typically four macro blocks) that are to be referred to in the decoding process, using a motion vector that is included in the obtained decoding target macro block, and stores the obtained macro blocks into the cache memory. The CPU then decodes the decoding target macro block using the stored macro blocks. At this time, the four macro blocks that had been stored in the decoding of the first decoding target macro block have been deleted from the cache memory. The CPU repeats the operation until all macro blocks of the P-picture have been decoded. After the P-picture is decode, the B-picture is decoded. In this case, basically the CPU repeats the above-described operation, but the pictures to be referred to are an I-picture and a P-picture.

In many cases, the macro blocks that are referred to in the decoding of the P- or B-picture are used only once in the decoding of one picture. Also, as the case now stands, according to a typical method, the MPEG data is processed one picture by one picture in the decoding thereof. Therefore, the reference picture data having been read into the cache memory is rarely accessed continuously and is discarded without being re-used. That is to say, the cache memory is used with extremely low efficiency.

According to the method of decoding the MPEG data, since it is impossible to store, into the cache memory, all macro blocks (the entire reference-target picture that has been decoded) that should be referred to in the motion compensation process, same pieces of data (macro blocks to be referred to) need to be read out from the main memory a lot of times. This deteriorates the performance of the decoding process.

As a technology aimed to solve the above-described problem, Patent Document 1 identified below discloses a method in which data stored in the cache memory is used efficiently to prevent reduction in the speed of the decoding process, making use of a property that B-pictures arranged in succession have similarity. According to this method, when a picture to be decoded is a B-picture and the next picture is also a B-picture, a decoding process for one macro block of the first picture and a decoding process for one macro block of the second picture are performed alternately such that the decoding processes for the adjacent two pictures are performed at the same time (instead of one macro block for each picture, a predetermined number of macro blocks for each picture may be decoded in the alternate decoding). That is to say, in Patent Document 1, when adjacent two pictures are both B-pictures, the decoding processes for the two pictures are performed alternately in unit of one macro block or a plurality of macro blocks. With this method, it is possible to reduce the probability of occurrence of a cache error during the motion compensation process since decoding processes for macro blocks located at a same position of the adjacent pictures are performed continuously. The method is making use of the property that motion compensation processes for macro blocks located at a same position of the adjacent pictures tend to use an area (macro block) in a reference picture that is located near the position of the macro blocks.

Patent Document 1: Japanese Patent No. 3322233, Description

Non-Patent Document 1: ITU-T Rec. H.264 ISO/IEC 14496-10 AVC Joint Final Committee Draft of Joint Video Specification (2002 Aug. 10) (page 54, 8.3.6.3 Default index orders, page 56, 8.3.6.4 Changing the default index orders)

SUMMARY OF THE INVENTION

According to the technology described above, when two B-pictures arranged in succession (for example, B2 and B3 in FIG. 14C, where "B2" and "B3" represent B-pictures whose picture numbers are "2" and "3", respectively) are decoded, there is no need to read out same pieces of data (macro blocks to be referred to) from the main memory a lot of times. The technology is thus effective in improving the performance of the decoding process.

Here, the technology disclosed in Patent Document 1 may be effective in the case of an encoded sequence where B2 and B3 invariably refer to an immediately forward picture (in FIG. 14C, I1, where "I1" represents an I-picture whose picture number is "1") and an immediately backward picture (in FIG. 14C, P4, where "P4" represents a P-picture whose picture number is "4"), respectively, in the display order (time order). However, the technology cannot deal with, for example, an encoded sequence that can specify forward reference pictures in units of macro blocks, the encoded sequence complying with H.264/MPEG4AVC defined in Non-Patent Document 1.

Furthermore, even in the case where reference pictures are specified in units of pictures, the technology cannot deal with an encoded sequence in which the B-picture does not necessarily refer to a picture (P4) that was decoded immediately before it in the decoding order.

More specifically, in the case of an encoded sequence where predetermined macro blocks in not only the continuous (adjacent) B-pictures (B2 and B3) following a P-picture (P4) but other pictures that do not continue to the B-pictures in the decoding order (for example, B5 and B6 in FIG. 14C) refer to the same corresponding pieces of data in the decoding thereof, the same pieces of data should be readout from the main memory again when the other pictures are decoded. This poses a problem that the performance of the decoding process is not improved.

It is therefore an object of the present invention to provide a decoding device, a decoding method, a decoding program, and an integrated circuit that improve the cache hit rate in a case of an encoded sequence where a picture to be referred to in the decoding target picture can be specified in units of slices or macro blocks, and/or in a case where a same piece of reference data is used by pictures that are not continuous in the decoding order.

The above-stated object of the present invention is fulfilled by a decoding device for decoding an encoded sequence generated by predictive encoding a plurality of frame images, wherein the encoded sequence is composed of a plurality of encoded frame images, each of the encoded frame images includes a plurality of encoded block images, at least part of the encoded block images is generated by predictive encoding a block image that refers to a reference block image and includes reference relationships information that indicates that the block image refers to the reference block image, the decoding device comprising: a cache memory; an obtaining unit operable to obtain the encoded sequence; an extracting unit operable to extract a plurality of pieces of reference relationships information from the obtained encoded sequence; an identifying unit operable to select one reference block image, and identify a plurality of reference-source encoded block images, by tracing backward from the selected reference block image, using the plurality of pieces of reference relationships information; a storing unit operable to read out one reference block image, and store the read-out reference block image into the cache memory; and a decoding unit operable to determine a plurality of encoded block images by referring to the reference block image and decode the determined encoded block images while the reference block image itself is stored in the cache memory without being discarded.

With the above-described structure, the decoding device identifies a plurality of encoded block images that are to be decoded by referring to a reference block image, by using the reference relationships information that is obtained for each encoded block image to be decoded by reference, stores the reference block image into the cache memory, and continuously decodes the plurality of encoded block images that are to be decoded by referring to the reference block image stored in the cache memory. This eliminates the necessity for reading out and storing the reference block image each time it decodes a plurality of encoded block images that refer to the same reference block image. Accordingly, the structure improves the cache hit rate in the case of an encoded sequence where a picture to be referred to in the decoding target picture can be specified in units of slices or macro blocks, and in the case where a same piece of reference data is used by pictures that are not continuous in the decoding order.

Especially, the above-described effect becomes noticeable when there are reference/non-reference relationships between discontinuous pictures as in H.264/MPEG4AVC. Also, this advantageous effect can be produced even in the case of an encoded sequence where a great number of pictures are included in one GOP (Group Of Pictures) (Long GOP in which 15 or more pictures are included), and discontinuous pictures (pictures distant from each other) refer to the same data so that certain macro blocks in the pictures distant from each other can be decoded.

In the above-stated decoding device, the reference relationships information may include reference frame information that indicates a reference-destination frame image, and the identifying unit selects one frame image among a plurality of reference-destination frame images that are indicated by a plurality of pieces of reference frame information included in the plurality of pieces of reference relationships information, and selects the reference block image from the selected frame image.

With the above-described structure, the decoding device can determine a reference block image included in one frame image to be referred to, by using a plurality of pieces of reference frame information included in the obtained pieces of reference relationships information, and identify the plurality of encoded block images that are to be decoded by referring to the determined reference block image.

In the above-stated decoding device, the reference relationships information may include reference position information that indicates a reference position in the reference-destination reference block image, and the identifying unit extracts a plurality of pieces of reference position information from a plurality of pieces of reference relationships information including a plurality of pieces of reference frame information that indicate the selected frame image as the reference-destination frame image, generates a reference list that is composed of the extracted pieces of reference position information, and identifies the plurality of encoded block images that correspond to reference position information indicating a reference position in the reference block image, by using the generated reference list.

With the above-described structure, the decoding device can easily identify the plurality of encoded block images that refer to the determined reference block image, by using the reference position information that is included in each of the obtained reference relationships information.

In the above-stated decoding device, the identifying unit may generate the reference list in which (i) encoded frame images each of which includes an encoded block image that includes a different one of the extracted pieces of reference position information, are associated with (ii) a plurality of pieces of decoding position information that respectively indicate positions of encoded block images included in the encoded frame images of (i), obtains, from the generated reference list, the plurality of pieces of reference position information that indicate that the reference areas are within the reference block images, and identifies the plurality of encoded block images by identifying a plurality of pieces of decoding position information that are respectively associated with the obtained pieces of reference position information.

With the above-described structure, the decoding device can easily identify the plurality of encoded block images by identifying a plurality of pieces of decoding position information that refer to the determined reference block image, by using the reference list.

In the above-stated decoding device, the decoding unit may sequentially decode encoded block images that are indicated by the plurality of pieces of decoding position information identified by the identifying unit.

With the above-described structure, the decoding device can easily identify the decoding destinations by using the identified pieces of decoding position information.

In the above-stated decoding device, the identifying unit may repeat identifying the plurality of encoded block images for each of all reference block images included in the frame image.

With the above-described structure, the decoding device can identify, for each reference block image included in one frame image, a plurality of encoded block images that refer to the reference block image.

In the above-stated decoding device, the identifying unit may arrange the pieces of reference position information in the reference list so that a plurality of pieces of reference position information, which indicate that reference areas are included in a same reference block image, belong to a same group.

With the above-described structure, the decoding device can easily identify the plurality of encoded block images by arranging the plurality of pieces of information included in the reference list.

In the above-stated decoding device, the identifying unit may calculate block numbers of reference block images that include reference areas identified by reference positions that are indicated by the plurality of pieces of reference position information included in the reference list, and re-arranges pairs of a piece of reference position information and apiece of decoding position information, in order of the calculated block numbers.

With the above-described structure, the decoding device can easily perform the arrangement of information included in the reference list by using the plurality of calculated start positions.

In the above-stated decoding device, the reference position may be composed of first position information and second position information, the first position information indicating a position on a first axis for a frame image, the second position information indicating a position on a second axis that is perpendicular with the first axis, the identifying unit calculates, from a coordinate point indicated by a first coordinate and a second coordinate, the block numbers of reference block images that includes the coordinate point.

With the above-described structure, the decoding device can identify the start position of the reference block image from the position information that is represented by coordinates on the frame image (a pair of the first position information and the second position information).

In the above-stated decoding device, the decoding unit may sequentially decode the identified plurality of encoded block images, by referring to the reference block image.

With the above-described structure, the decoding device can cause the decoding unit to continuously decode the identified plurality of encoded block images, by using the reference block image stored in the cache memory, under control of the control unit. That is to say, the decoding device can decode all encoded block images that refer to the reference block image, by reading out the reference block image only once.

In the above-stated decoding device, each of the encoded block images may include playback information which indicates an order of playback to be performed, and the decoding unit sequentially decodes the identified plurality of encoded block images, by referring to the reference block image, based on the order of playback indicated by the playback information.

With the above-described structure, the decoding device can decode the plurality of encoded block images identified by the identifying unit, in the reading order.

The above-stated decoding device may further comprise a control unit operable to control operations of the storing unit and the decoding unit to be repeated for each of the plurality of encoded block images identified by the identifying unit, wherein the storing unit, after the decoding unit decodes the plurality of encoded block images, obtains another reference block image from the one frame image, under control of the control unit, the decoding unit, after decoding the plurality of encoded block images, decodes a plurality of encoded block images that refer to the another reference block image, under control of the control unit, and the control unit controls operations of the storing unit and the decoding unit to be repeated, until all reference block images included in the frame image are used.

With the above-described structure, the decoding device can decode all encoded block images that refer to a same frame image, for each of one or more reference block images included in the frame image. This enables the decoding device to use the data (reference block image) in the cache memory efficiently.

In the above-stated decoding device, the encoded sequence may include (i) at least one intra encoded frame image that was encoded without referring to another frame image, and (ii) a plurality of non-intra encoded frame images that were encoded by referring to another frame image, the decoding unit, as a first decoding process for the encoded sequence, generates a frame image by decoding an intra encoded frame image, and the storing unit, the decoding unit, and the control unit, as a first decoding performed on the plurality of non-intra encoded frame images, decode all non-intra encoded frame images that refer to the frame image.

With the above-described structure, the decoding device can first generate a frame image by decoding an intra encoded frame image, then decode an encoded block image that refers to the generated frame image, and decode an encoded frame image that refers to the frame image.

BRIEF DESCRIPTION OF THE DRAWING

FIG. 4A shows an example of the data structure of the reference position information table T100, and FIG. 4B shows an example of the index information table T200.

FIG. 5 shows an example of the data structure of the sort table T300.

DESCRIPTION OF CHARACTERS

Figure 1:
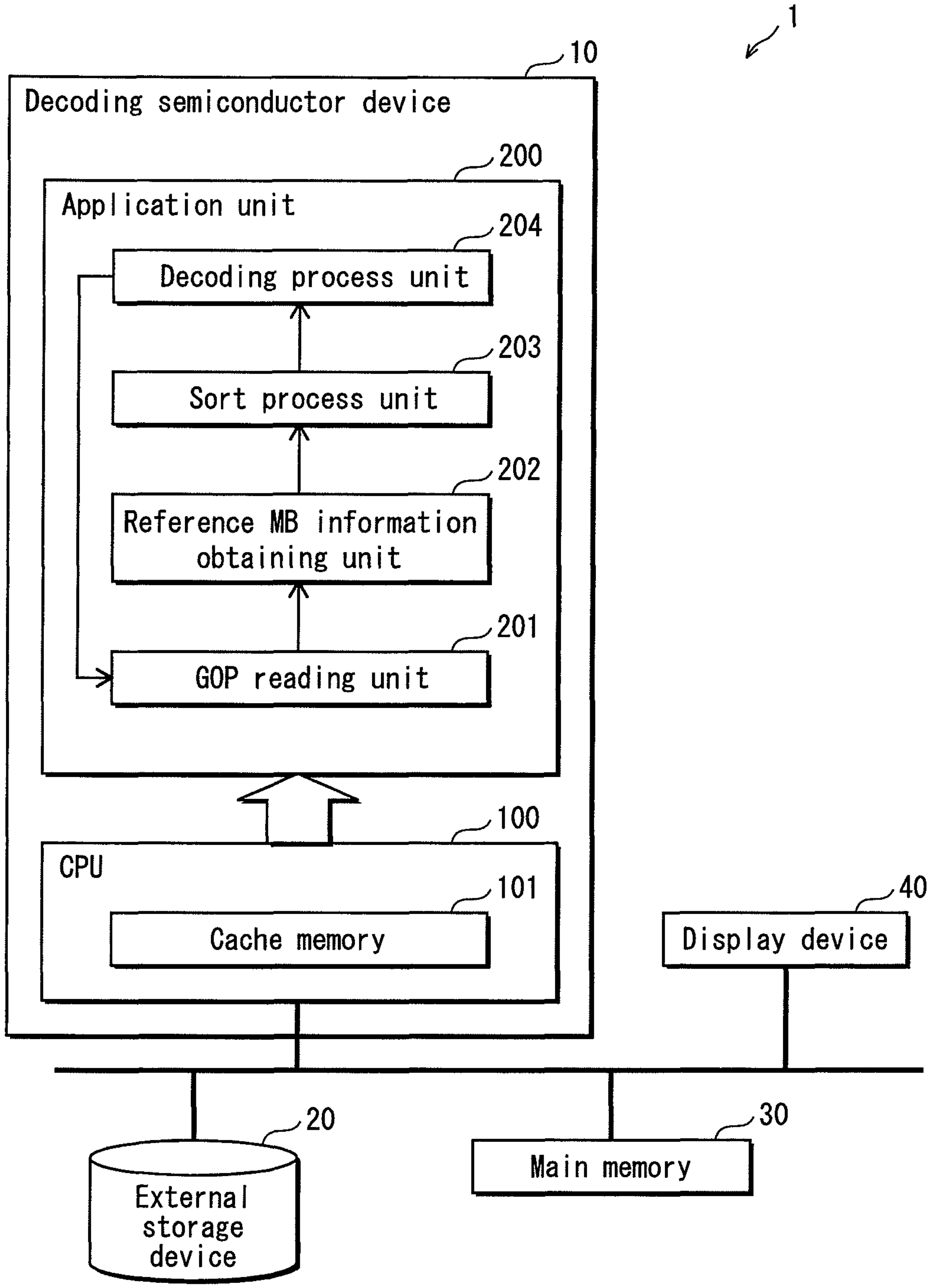
FIG. 1 is a block diagram showing the structure of the decoding process system 1.

1 decoding process system
10 decoding semiconductor device
20 external storage device
30 main memory
40 display device
100 CPU
200 application unit
201 GOP reading unit
202 reference MB information obtaining unit
203 sort process unit
204 decoding process unit
250 decoding process control unit
251 picture group selection unit
252 reference MB reading unit
253 MB decoding process unit

DETAILED DESCRIPTION OF THE INVENTION

1. Embodiment 1

The following describes a decoding process system 1 as Embodiment 1 of the present invention.

As shown in FIG. 1, the decoding process system 1 includes a decoding semiconductor device 10, an external storage device 20, a main memory 30, and a display device 40.

Here, the decoding process system 1 is specifically a decoding device for decoding compress-encoded images. The display device 40 may be embedded in the decoding device as described above, or may be an independent device that is separate from and connected with, by a dedicated line, the decoding device. Similarly, the external storage device 20 may be embedded in the decoding device, or may be an independent device that is separate from and connected with, by a dedicated line, the decoding device.

The external storage device 20 stores MPEG data. The external storage device 20 is specifically HDD, CD/DVD or the like.

The main memory 30 has an area for storing MPEG data to be decoded and image data having been decoded, when the MPEG data is decoded.

The decoding semiconductor device 10 generates image data by decoding the MPEG data stored in the external storage device 20 based on a decoding process program for decoding MPEG data. Also, the decoding semiconductor device 10 performs a format conversion onto the decoded image data so that the display device 40 can display the data, and transfers the conversion result to the display device 40.

The display device 40 displays the images after the format conversion.

In the MPEG data stream decoding process of the present invention, the GOP unit, a unit used in the present invention, is a set of pictures that includes pictures of at least one GOP (Group Of Pictures: a group of a predetermined number of pictures that belong to between GOP headers), where all pictures constituting a predetermined unit can be decoded by referring only pictures included in the same predetermined unit.

Figure 2:
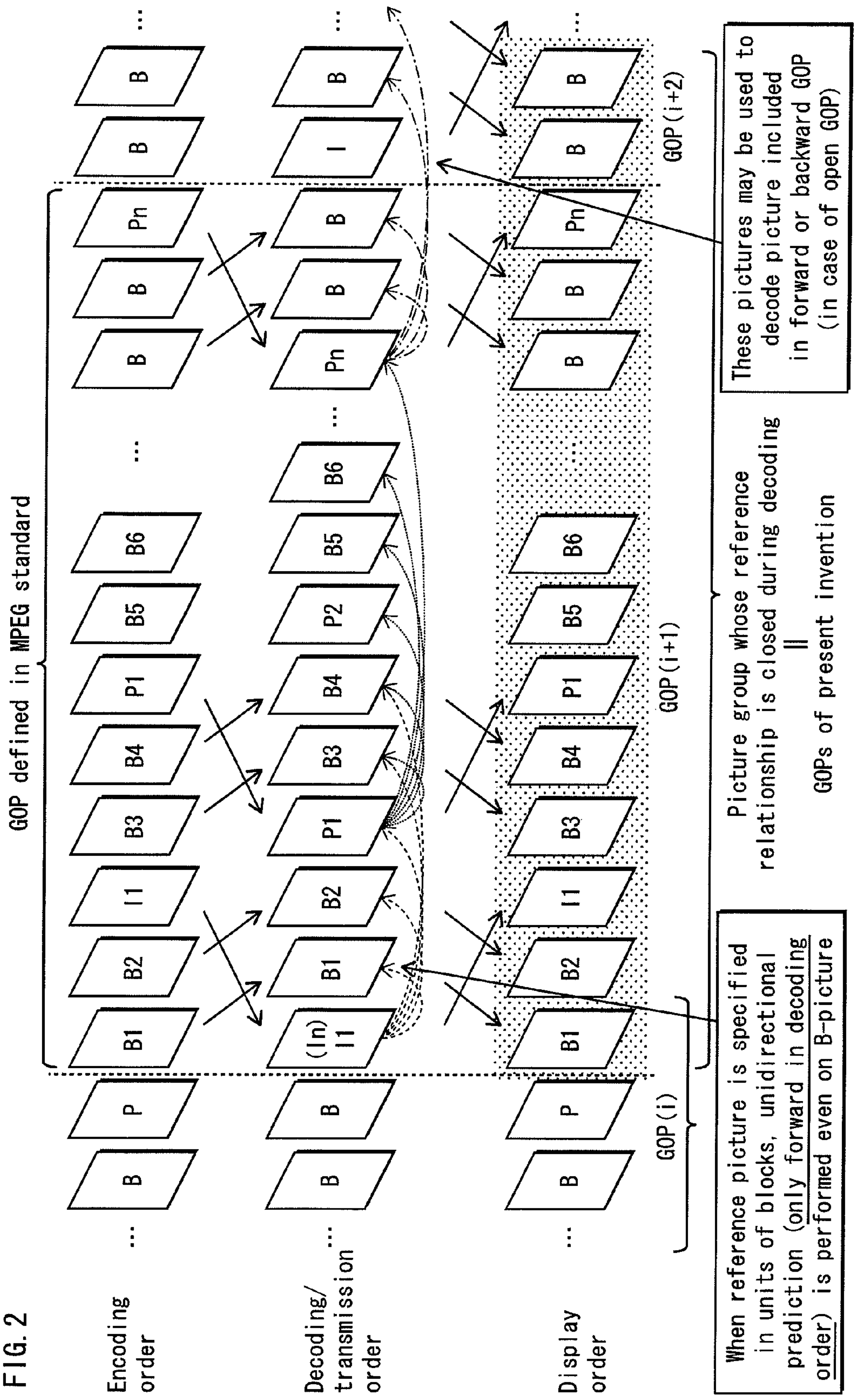
FIG. 2 shows a set of data included in the GOP (Group Of Pictures) in the present invention.

Here, the GOP unit of the present invention will be explained with reference to FIG. 2. FIG. 2 shows, from top of the drawing, an encoding order, a decoding/transmission order, and a display order of the pictures. In the decoding/ transmission order, three types of broken lines respectively indicate directions from the reference source picture to the reference destination picture. For example, it indicates that I1 predetermined pixel values are referred to when a picture P1 (or a predetermined macro block in P1) is decoded. Also, for example, it indicates that, when pictures B3 and B4 (or predetermined macro blocks in B3 and B4) are decoded, both forward and backward referencing are performed because B3 and B4 follow P1 in the decoding/transmission order, but follow I1 and precede P1 in the encoding and display orders.

In an example shown in FIG. 2, a GOP defined in the present invention is composed of, among conventional GOPs GOP(i), GOP(i+1), and GOP(I+2) shown in the drawing, GOP(i+1) and GOP(i+2) in the display order as indicated by the hatching.

Accordingly, in the case where, for example, a B-picture included in a GOP immediately preceding or following another GOP refers to a picture included in said another GOP, a GOP unit of the present invention is constituted with the two GOPs. More specifically, when a B-picture in GOP(i+2) refers to a P-picture in GOP(i+1), a GOP unit of the present invention is constituted with GOP(i+1) and GOP(i+2). Here, a GOP such as GOP(i+2) that includes a picture which is decoded by referring to a picture in the immediately backward GOP or a picture in the immediately forward GOP is called an "open GOP".

Conversely, a GOP of the present invention is not constituted with GOP(i) and GOP(i+1) since they do not have a reference relationship.

In the present invention, the target of the decoding process includes an encoded sequence that includes a picture, such as picture Pn included in GOP(i+1) in decoding/transmission order shown in FIG. 2, that is decoded by referring to a picture P1 that is over a closest picture P2.

Here, an example of the data structure of MPEG data stream will be described. Note that herein after, macro block may be merely referred to as MB.

Figure 3:
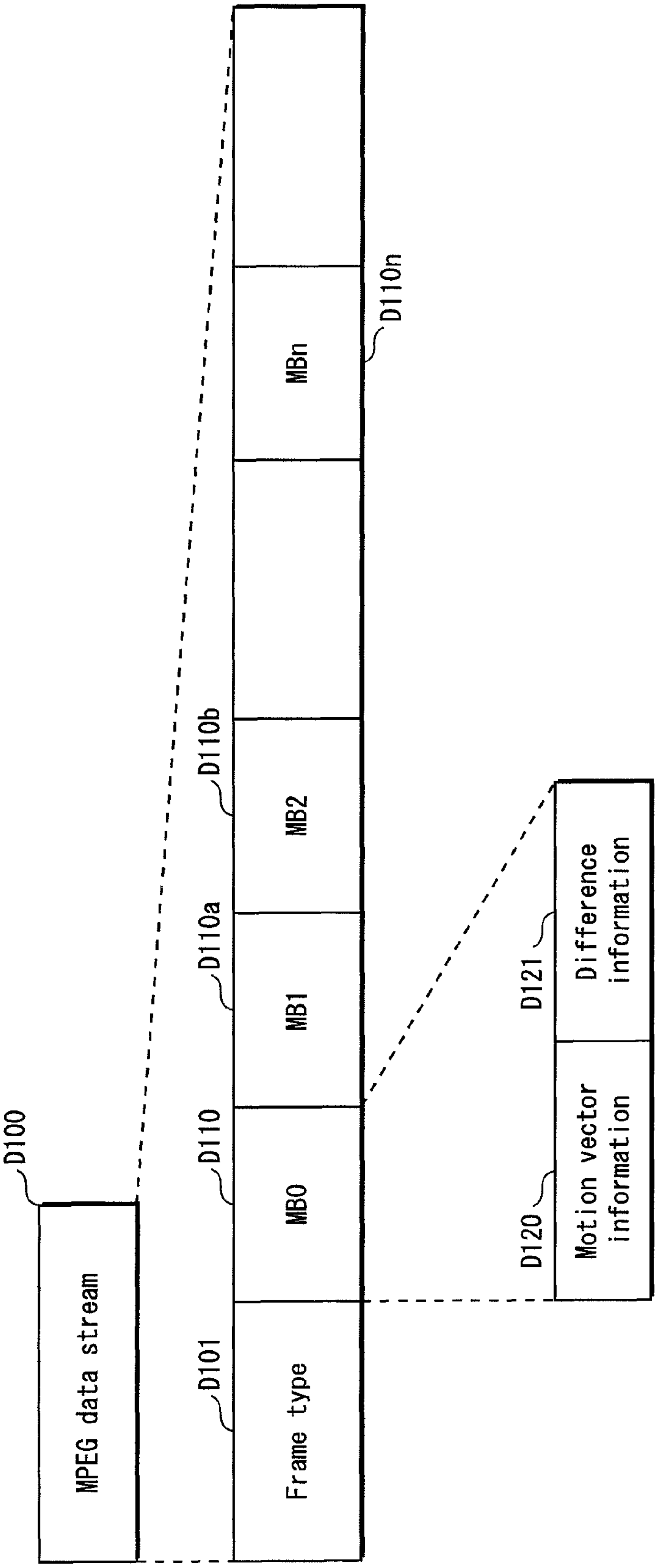
FIG. 3 shows an example of the data structure of the MPEG data stream.

An MPEG data stream D100, as shown in FIG. 3, is composed of a frame type D101, macro block information (MB0) D110, macro block information (MB1) D110*a*, macro block information (MB2) D110*b*, . . . macro block information (MBn) D110*n*, . . . . The frame type D101 and macro block information (MB0) D110, D110*a*, D110*b*, . . . D110*n*, . . . have been encoded.

The frame type D101 is information for identifying a frame (I-picture, B-picture, or P-picture) in the MPEG data stream D100.

Also, the macro block information (MB0) D110 is composed of motion vector information D120 and difference information D121. The motion vector information D120 is information that indicates a position of a picture in a macro block that is to be referred to in the decoding process, and indicates the position as an X,Y coordinate, where the X coordinate indicates a position in the horizontal direction, and the Y coordinate indicates a position in the vertical direction in a picture (frame). That is to say, in a decoding target macro block, when decoding is performed using only the difference information, a picture composed of image data, which does not include a piece of image data to be referred to, is generated.

Typically, one macro block is composed of 16×16 pixels. Also, typically, in the decoding process using the motion vector, a macro block composed of 16×16 pixels starting with a position indicated by the motion vector information is used.

Note that the macro block information (MB1) D110*a*, macro block information (MB2) D110*b*, . . . macro block information (MBn) D110*n*, . . . have the same data structure as the macro block information (MB0) D110, and thus description thereof is omitted here.

1.1 Structure of Decoding Semiconductor Device 10

The decoding semiconductor device 10, as shown in FIG. 1, composed of a CPU 100 and an application unit 200.

(1) CPU 100

The CPU 100, as shown in FIG. 1, includes a cache memory 101. The cache memory 101 is a memory that has less capacity than the main memory 30, but is designed to be accessible at an extremely high speed.

The CPU 100, a constituent element of a computer system, reads out a program stored in the application unit 200 such that the functions are achieved as the read-out program and the hardware resources cooperate with each other.

The CPU 100, in the process of decoding MPEG data, reads out one or more pieces of MPEG data in units of GOPs from the external storage device 20, and stores the one or more pieces of MPEG data included in the read-out GOPs into the main memory 30.

The CPU 100 reads out the MPEG data from the main memory 30, generates image data by decoding the read-out MPEG data, and stores the generated image data into the main memory 30.

The CPU 100 reads out data, which is to be referred to in the decoding, from the main memory 30, and stores the read-out data into the cache memory 101. In the present example, the CPU 100 reads out, from the main memory 30, four macro blocks which includes an area corresponding to a macro block to be referred to by the decoding target picture, namely, a macro block specified by a motion vector. The CPU 100 then stores the read-out four macro blocks into the cache memory 101. Note that herein after, the read-out four macro blocks may also be referred to as reference block images.

When it accesses the same data in succession, the CPU 100 uses the data stored in the cache memory 101 provided in the CPU 100 (this is called cache hit), not obtaining data from the main memory 30 each time it accesses the data. This reduces the number of accesses to the main memory 30, and increases the processing speed. However, since every data accessed by the CPU 100 is stored into the cache memory 101 one after another, desired data may not exist in the cache memory 101 when another data has been accessed after the desired data had been accessed previously (this is called cache error). In the case of a cache error, the CPU 100 accesses the main memory 30 to obtain the data again, and stores the obtained data into the cache memory 101.

(2) Application Unit 200

The application unit 200 is a concrete means in which an application program and the hardware resources cooperate with each other, and, as shown in FIG. 1, includes a GOP reading unit 201, a reference MB information obtaining unit 202, a sort process unit 203, and a decoding process unit 204.

(2-1) GOP Reading Unit 201

The GOP reading unit 201, at the start of the MPEG data decoding process, or upon receiving a read instruction (instructing to read out the MPEG data stream) from the decoding process unit 204, reads out the MPEG data stream from the external storage device 20 in units of GOPs of the present invention, and stores the read-out GOPs into the main memory 30.

Upon completion of storing the GOPs, the GOP reading unit 201 sends, to the reference MB information obtaining unit 202, an analysis instruction instructing to analyze one or more pictures included in the stored GOPs.

Upon receiving a GOP decoding completion notification indicating that decoding of GOPs obtained from the decoding process unit 204 has been completed, the GOP reading unit 201 judges whether or not there is an MPEG data stream that has not been read out. When it judges that there is an MPEG data stream that has not been read out, the GOP reading unit 201 reads out the next GOP and performs the above-described operation. When it judges that there is no MPEG data stream that has not been read out, the GOP reading unit 201 ends the process.

(2-2) Reference MB information Obtaining Unit 202

The reference MB information obtaining unit 202 performs the following operation when it receives the analysis instruction from the GOP reading unit 201.

The reference MB information obtaining unit 202 checks in sequence, with respect to each of one or more MPEG data streams included in the GOPs stored in the main memory 30, whether the frame type of the MPEG data stream is any of the I-picture, P-picture, and B-picture. Here, typically, the frame type has been encoded. Thus, to check the frame type (I-picture, P-picture, or B-picture) of an analysis target MPEG data stream, the reference MB information obtaining unit 202 needs to decode the frame type.

When the frame type of an analysis target MPEG data stream is any of the I-picture, P-picture, and B-picture, the reference MB information obtaining unit 202 extracts the motion vector information from each macro block information (herein after referred to as "analysis target MB") included in the analysis target MPEG data stream (herein after referred to as "analysis target picture"), and identifies a picture (reference picture) being referred to and a position (reference position) to be referred to in the reference picture. Here, typically, the motion vector information has been encoded. Thus, to identify the reference picture and the reference position referred to by the analysis target MB, the reference MB information obtaining unit 202 needs to decode the motion vector information. Note that the reference picture referred to by the analysis target MB may be specified in units of macro blocks, or may be detected based on the value written in the slice header in which the macro block is included.

The method for identifying the reference picture is the same as a conventional one, and description thereof is omitted here. The reference position is also identified by a conventional method in which X and Y coordinates of the reference position are identified using the motion vector. This makes it possible to identify an image area (a macro block composed of 16×16 pixels starting with the reference position) to be used in the reference during the decoding process, based on the reference position. For this purpose, the reference MB information obtaining unit 202 generates a reference position information table T100, an example of which is shown in FIG. 4A, for each reference picture. The reference position information table T100 has an area for storing one or more sets of an MB number, an X coordinate, and a Y coordinate. The MB number indicates a number for identifying the analysis target MB. The X coordinate indicates a position in the horizontal direction, and the Y coordinate indicates a position in the vertical direction in the reference picture. Also, the sign "-" appearing the in the table indicates that there is no position to be referred to. That is to say, it means that the analysis target MB identified by the MB number of the same set is decoded without referring to a macro block of the reference picture. Hereinafter, the set of an MB number, an X coordinate, and a Y coordinate is referred to as reference MB information. This means that the reference MB information obtaining unit 202 can obtain information of the reference picture and one or more pieces of reference MB information by identifying the reference picture and the reference position.

When the frame type of the MPEG data stream is any of the I-picture, P-picture, and B-picture, the reference MB information obtaining unit 202 further generates an index information table T200, an example of which is shown in FIG. 4B, for each analysis target reference picture, by attaching an index to each piece of difference information included in each analysis target MB (macro block information) in the analysis target picture. The index information table T200 has an area for storing one or more sets of an MB number, index information, and data start position information. The MB number indicates a number for identifying the analysis target MB. The index information indicates an index attached to the difference information included in the analysis target MB. The data start position information is information indicating a start position of the difference information to which the index indicated by the index information is attached.

The reference MB information obtaining unit 202, upon completion of analyzing all the MPEG data streams included in the GOPs, sends a sort instruction instructing to sort the generated one or more reference position information tables, to the sort process unit 203.

Note that, when the analysis target picture is a B-picture, there are two pictures to be referred to. In this case, the reference MB information obtaining unit 202 needs to generate a reference position information table for each of the two reference pictures. That is to say, when the analysis target picture is a B-picture, the reference MB information obtaining unit 202 generates two reference position information tables and one index information table.

(2-3) Sort Process Unit 203

The sort process unit 203, upon receiving the sort instruction from the reference MB information obtaining unit 202, generates a sort table T300, an example of which is shown in FIG. 5A, for each reference picture identified in each of the one or more reference position information tables generated by the reference MB information obtaining unit 202. Note that, in the sort table T300 shown in FIG. 5A as an example, the reference picture is I-picture "I1" shown in FIG. 2.

The sort table T300 has an area for storing one or more sets of a reference picture, an X coordinate, a Y coordinate, a decoding picture, a decoding target MB, and index information.

The reference picture indicates a picture to be referred to during the decoding process. The X coordinate indicates a position in the horizontal direction, and the Y coordinate indicates a position in the vertical direction in the reference picture.

The decoding picture indicates an MPEG data stream (herein after referred to as "decoding target data") that is to be decoded by using the reference picture. The decoding target MB indicates a macro block among one or more macro blocks included in the decoding target data (namely, the decoding target MPEG data stream). For example, decoding target MB (x,y) indicates a macro block that is located at a position identified by "x" in the horizontal direction and "y" in the vertical direction in the picture after decoding. Here, the decoding target MB (x,y) corresponds one-to-one to the macro block information included in the MPEG data stream forming the corresponding decoding picture. For example, the decoding target MB (0,0) corresponds to macro block information MB0.

The index information indicates an index attached to the difference information included in the macro block information indicated by the decoding target MB, during the decoding process.

Note that, herein after, the set of a reference picture, an X coordinate, a Y coordinate, a decoding picture, a decoding target MB, and index information is referred to as decoding process information.

When the sort table T300 is generated, the sort process unit 203 sorts information of the sort table using "Key=int(Y/16)×120+int(X/16)" as a key. Here, X and Y are values of the X and Y coordinates included in the decoding process information, respectively.

The sort process unit 203, upon completion of generating the sort table for each reference picture, sends a decode instruction instructing to perform the decoding process, to the decoding process unit 204.

The above-indicated equation for "Key" is an equation used for calculating an MBA (Macro Block Address) of the macro block including the reference position.

The sort process unit 203 specifies, for each reference block image, one or more decoding pictures whose reference destinations are the reference block image and one or more decoding target MBs thereof, and sorts the specified decoding pictures and decoding target MBs so that they are continuous to each other. The sort process unit 203 corresponds to the specifying unit of the present invention.

The following explains a specific operation for generating the sort table.

Process (1): The sort process unit 203 selects, from among one or more reference pictures, a reference picture for which the sort table has not been generated.

Process (2): The sort process unit 203 generates a pre-sort sort table for the selected reference picture. The sort process unit 203 then calculates the MBA for each of the decoding picture and the decoding target MB included in each piece of decoding process information in the generated pre-sort sort table, by applying the above-indicated equation for "Key" to each pair of X coordinate and Y coordinate included in each piece of decoding process information in the generated pre-sort sort table.

Process (3): The sort process unit 203 selects, from among one or more MBAs generated in Process (2) above, an MBA having the smallest value among values that have not been selected. That is to say, the sort process unit 203 selects one reference block image. The sort process unit 203 specifies one or more pieces of decoding process information that include a pair of X coordinate and Y coordinate from which the same value as the value of the selected MBA is calculated when the equation for "Key" is applied thereto. That is to say, the sort process unit 203 specifies one or more pairs of a decoding picture and a decoding target MB thereof, where the reference destination of the decoding picture is the determined reference block image.

Process (4): The sort process unit 203 sorts the contents of the sort table so that the specified one or more pieces of decoding process information are continuous to each other.

Process (5): The sort process unit 203 generates a post-sort sort table for the reference picture selected in the Process (1) above by repeating the above-described Processes (3) and (4) until all values indicated by each of the one or more MBAs are selected.

Process (6): The sort process unit 203 generates post-sort sort tables for all the reference pictures by repeating the above-described Processes (1) through (5).

(2-4) decoding process unit 204

Figure 6:
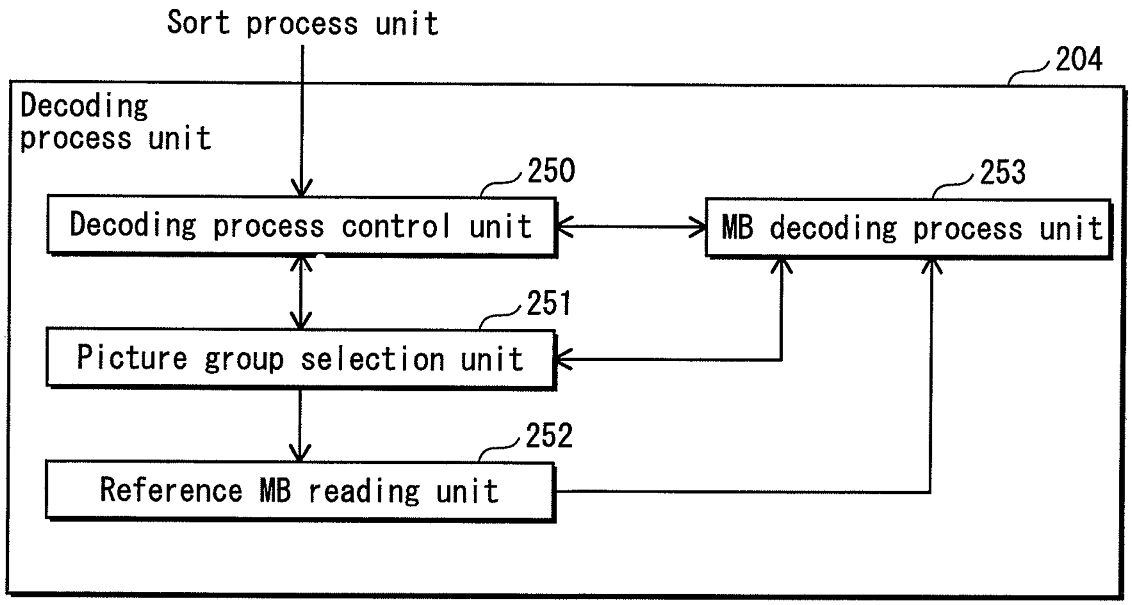
FIG. 6 is a block diagram showing the structure of the decoding process unit 204.

The decoding process unit 204, as shown in FIG. 6, is composed of a decoding process control unit 250, a picture group selection unit 251, a reference MB reading unit 252, and an MB decoding process unit 253.

(Decoding Process Control Unit 250)

The decoding process control unit 250, upon receiving the decoding instruction from the sort process unit 203, obtains one MPEG data stream from a GOP stored in the main memory 30, and judges whether or not the frame type of the obtained MPEG data stream is I-picture. Here, typically, the frame type has been encoded. Thus, the decoding process control unit 250 decodes the frame type before it checks the frame type of the obtained MPEG data stream.

When it judges that the obtained MPEG data stream is I-picture, the decoding process control unit 250 sends an I-picture decoding instruction for decoding the I-picture, to the MB decoding process unit 253.

When it judges that the obtained MPEG data stream is not I-picture, the decoding process control unit 250 judges whether or not there is a decoded I-picture or P-picture that is referred to by the obtained MPEG data stream. When it judges that there is such a decoded I-picture or P-picture, the decoding process control unit 250 determines a picture to be referred to, obtains the determined reference picture, and sends, to the picture group selection unit 251, an selection instruction instructing to select a group of pictures that refer to the obtained reference picture.

When it judges that there is node coded I-picture or P-picture that is referred to, the decoding process control unit 250 obtains one MPEG data stream that has not been obtained, from the GOP stored in the main memory 30. The decoding process control unit 250 then performs the above-described process onto the obtained MPEG data stream.

The decoding process control unit 250, upon receiving from the MB decoding process unit 253 a first decoding completion notification indicating that decoding of an I-picture is completed, or upon receiving from the picture group selection unit 251 a second decoding completion notification indicating that decoding using a reference picture is completed, judges whether or not decoding of all pictures in the GOP is completed. When it judges that decoding of all pictures in the GOP is completed, the decoding process control unit 250 ends the process. When it judges that decoding of all pictures in the GOP is not completed, the decoding process control unit 250 obtains one picture that has not been obtained, from the GOP stored in the main memory 30. The decoding process control unit 250 then performs the above-described process onto the obtained picture.

Note that the decoding process control unit 250 sends the GOP decoding completion notification to the GOP reading unit 201 when it ends the process.

Here, "decoding an I-picture" indicates "decoding an MPEG data stream whose frame type is I-picture".

(Picture Group Selection Unit 251)

The picture group selection unit 251, upon receiving the selection instruction from the decoding process control unit 250, selects a group of pictures which respectively refer to four macro blocks, where each set of four macro blocks referred to by the pictures includes the same macro block that has the reference position. To select the group of pictures, the picture group selection unit 251 uses a sort table which, among the one or more sort tables generated by the sort process unit 203, corresponds to the reference picture obtained by the decoding process control unit 250. Here, the group of pictures is a set of one or more MPEG data streams included in the GOP stored in the main memory 30. For example, the picture group selection unit 251 selects the group of pictures by calculating an MBA of a macro block that includes the reference position, by using the equation for "Key", and obtaining one or more pieces of decoding process information which include MBAs that are the same as the calculated MBA.

The picture group selection unit 251, after obtaining one or more pieces of decoding process information, sends a reference MB read instruction instructing to obtain four macro blocks, to the reference MB reading unit 252.

The picture group selection unit 251, upon receiving from the MB decoding process unit 253 a third decoding completion notification indicating that the decoding process is completed by referring to the macro blocks, judges whether or not there is a group of pictures that refer to another macro block in the reference picture.

When it judges that there is a group of pictures that refer to another macro block in the reference picture, the picture group selection unit 251 obtains the group of pictures that refer to another macro block in the reference picture. The picture group selection unit 251 then performs the above-described operation onto the obtained group of pictures.

When it judges that there is no group of pictures that refer to another macro block in the reference picture, the picture group selection unit 251 sends an intra MB decoding instruction instructing to perform decoding without referring to the macro block, to the MB decoding process unit 253.

Hereinafter, a decoding target macro block that is decoded by referring to a macro block may also be referred as a "non-intra MB", and a decoding target macro block that is decoded without referring to a macro block may also be referred as an "intra MB".

Here, one example of obtaining the decoding process information will be described with reference to the sort table T300 shown in FIG. 5.

The picture group selection unit 251 calculates a value of "Key" using the X and Y coordinates included in decoding process information T301. As a result of this calculation, Key=0 is obtained. Note that, with the calculated value of "Key", the starting number of the macro block to be referred to is determined.

The picture group selection unit 251 obtains other pieces of decoding process information which each include values of X and Y coordinates from which the same value as the calculated value of "Key" is calculated. In this example, decoding process information T302 and T303 are obtained.

With the above-described operation, the picture group selection unit 251 obtains decoding process information T301, T302 and T303.

After the decoding process using the decoding process information T301, T302 and T303 is completed, the picture group selection unit 251 calculates a value of "Key" using the X and Y coordinates included in decoding process information T304, and then performs the above-described operation.

When the above-described operation has been performed onto all pieces of decoding process information included in the sort table T300, the decoding process using the reference picture "I1" is completed.

(Reference MB Reading Unit 252)

The reference MB reading unit 252, upon receiving the reference MB read instruction from the picture group selection unit 251, reads out, from the main memory 30, four macro blocks among which there is a macro block whose MBA is identified by the value of "Key" that was used when the picture group selection unit 251 obtained one or more pieces of decoding process information, and stores the read-out four macro blocks into the cache memory 101.

The reference MB reading unit 252 sends an MB decoding instruction instructing to decode MB, to the MB decoding process unit 253.

For example, when the MBA (Macro Block Address) of the macro block specified by the value of "Key" that was used to obtain one or more pieces of decoding process information is (k, l), the reference MB reading unit 252 reads out, from the main memory 30, four macro blocks whose MBAs are (k, l), (k+1, l), (k, l+1) and (k+1, l+1), and stores the read-out four macro blocks into the cache memory 101.

(MB Decoding Process Unit 253)

The MB decoding process unit 253, upon receiving the I-picture decoding instruction from the decoding process control unit 250, decodes all macro blocks that respectively correspond to the pieces of macro block information included in the MPEG data streams (their frame type is "I-picture") obtained by the decoding process control unit 250, based on the macro block information. After the decoding of the I-pictures is completed, the MB decoding process unit 253 sends the first decoding completion notification to the decoding process control unit 250. At this point in time, the decoded I-pictures (image data) have been stored in the main memory 30. Note here that "decoding a macro block" means "decoding an encoded macro block". Also note that there are two methods for decoding an encoded macro block: a method in which the motion vectors and the difference information are used for the decoding; and a method in which only the difference information is used for the decoding.

The MB decoding process unit 253, upon receiving the MB decoding instruction from the reference MB reading unit 252, sequentially decodes, all the macro blocks indicated by the one or more pieces of decoding process information obtained by the picture group selection unit 251, using the four macro blocks stored in the cache memory 101, with respect to a group of pictures selected by the picture group selection unit 251. For example, in the case where the picture group selection unit 251 obtains the decoding process information T301, T302 and T303 shown in FIG. 5, the MB decoding process unit 253 first selects the decoding process information T301, and decodes a macro block corresponding to macro block information indicated in the selected decoding process information T301, by using the macro block information. Next, the MB decoding process unit 253 selects the decoding process information T302, and decodes a macro block corresponding to macro block information indicated in the selected decoding process information T302, by using the macro block information. After this, the MB decoding process unit 253 selects the decoding process information T303, and decodes a macro block corresponding to macro block information indicated in the selected decoding process information T303, by using the macro block information.

In performing the above-described operation, the MB decoding process unit 253 obtains difference information included in the decoding target macro block information, by identifying the starting position of the data that corresponds to the index indicated by the index information included in the selected decoding process information. The MB decoding process unit 253, as in conventional technologies, decodes the macro block by subjecting the obtained difference information (which has been encoded, as mentioned earlier) into each process of variable-length decoding, inverse quantization, inverse DCT, and motion compensation. The MB decoding process unit 253 can decode one macro block by reading out, from the cache memory 101, a macro block indicated by the X and Y coordinates included in the decoding process information, and adding the read-out macro block into the pixel space data restored by the inverse DCT.

After it completes the decoding of the macro blocks corresponding to all the macro block information indicated in the one or more pieces of decoding process information obtained by the picture group selection unit 251, the MB decoding process unit 253 sends the third decoding completion notification to the picture group selection unit 251.

The MB decoding process unit 253, upon receiving the intra MB decoding instruction from the picture group selection unit 251, judges whether or not there is a piece of macro block information indicating an intra MB, excluding the macro block information that has been used in the decoding, in one or more MPEG data streams that refer to the reference picture obtained by the decoding process control unit 250.

When it judges that there is a piece of macro block information indicating an intra MB, the MB decoding process unit 253 decodes all the intra MBs included in the one or more MPEG data streams that refer to the reference picture.

Here, the MB decoding process unit 253, as in conventional technologies, decodes the intra MBs by subjecting the obtained difference information included in the macro block information into each process of variable-length decoding, inverse quantization, and inverse DCT.

When it judges that there is no piece of macro block information indicating an intra MB, or when decoding of all the intra MBs is completed, the MB decoding process unit 253 sends the second decoding completion notification to the decoding process control unit 250.

1.2 Operation of Decoding Process System 1

(1) Operation of Decoding Semiconductor Device 10

Figure 7:
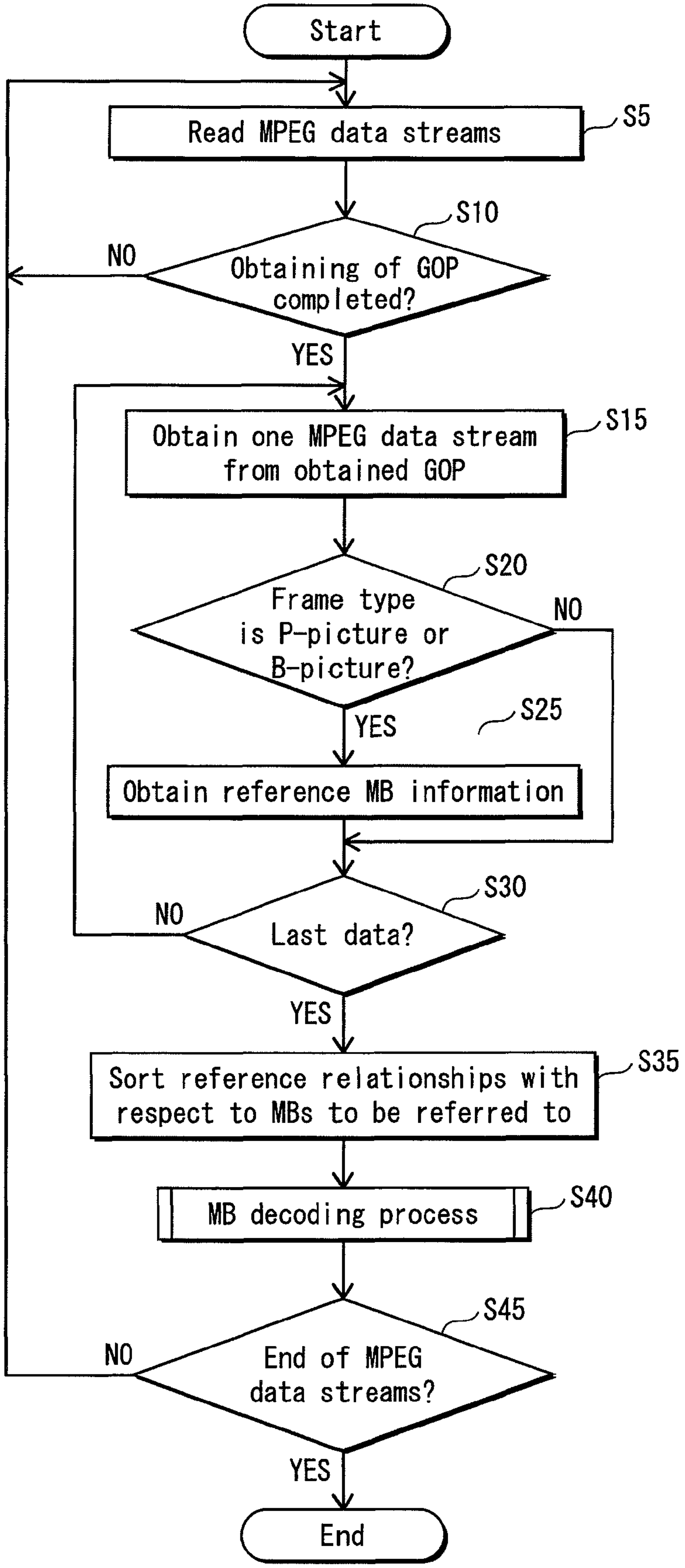
FIG. 7 is a flowchart showing the operation of the decoding semiconductor device 10.

Here, the operation of the decoding semiconductor device 10 will be described with reference to the flowchart shown in FIG. 7.

The GOP reading unit 201 reads out the MPEG data streams stored in the external storage device 20, in units of GOPs, and stores them into the main memory 30 (step S5).

The GOP reading unit 201 judges whether or not storing of at least one GOP into the main memory 30 is completed (step S10).

When it judges that the storing is not completed (NO in step S10), the GOP reading unit 201 returns to step S5.

When it judges that the storing is completed (YES in step S10), the GOP reading unit 201 sends the analysis instruction to the reference MB information obtaining unit 202. Upon receiving the analysis instruction from the GOP reading unit 201, the reference MB information obtaining unit 202 obtains one MPEG data stream from a GOP stored in the main memory 30 (step S15).

The reference MB information obtaining unit 202 judges whether or not the frame type of the obtained MPEG data stream is P-picture or B-picture.

When it judges that the frame type of the obtained MPEG data stream is P-picture or B-picture (YES in step S20), the reference MB information obtaining unit 202 obtains the reference MB information from one or more pieces of macro block information included in the obtained MPEG data stream, and generates the reference position information table for the obtained MPEG data stream (step S25). Also, the reference MB information obtaining unit 202 generates the index information table for each of the obtained MPEG data streams (whose frame types are P-picture or B-picture).

When it judges that the frame type of the obtained MPEG data stream is neither P-picture nor B-picture, namely, the frame type of the obtained MPEG data stream is I-picture (NO in step S20), or after the reference position information table is generated, the reference MB information obtaining unit 202 judges whether or not the obtained MPEG data stream is the last data in the GOP (step S30).

When it judges that the obtained MPEG data stream is not the last data in the GOP (NO in step S30), the reference MB information obtaining unit 202 returns to step S15.

When it judges that the obtained MPEG data stream is the last data in the GOP (YES in step S30), the reference MB information obtaining unit 202 sends the sort instruction to the sort process unit 203. Upon receiving the sort instruction from the reference MB information obtaining unit 202, the sort process unit 203 generates a sort table for each reference picture identified in each of the one or more reference position information tables generated by the reference MB information obtaining unit 202, and thus sorts the reference relationships with respect to the MBs to be referred to (step S35).

After completing to generate the sort table for each reference picture, the sort process unit 203 sends the decoding instruction to the decoding process unit 204. The decoding process unit 204 receives the decoding instruction from the sort process unit 203.

The decoding process unit 204 decodes all the MPEG data streams included in the GOP by performing the MB decoding process (step S40).

After completing the MB decoding process, the decoding process unit 204 sends the GOP decoding completion notification to the GOP reading unit 201. The GOP reading unit 201 receives the GOP decoding completion notification from the decoding process unit 204. The GOP reading unit 201 judges whether or not there is an MPEG data stream that has not been read out, namely, the reading of the MPEG data streams has ended (step S45). When it judges that the reading of the MPEG data streams has not ended (NO in step S45), the GOP reading unit 201 returns to step S5. When it judges that the reading of the MPEG data streams has ended (YES in step S45), the GOP reading unit 201 ends the process.

(2) MB Decoding Process

Figure 8:
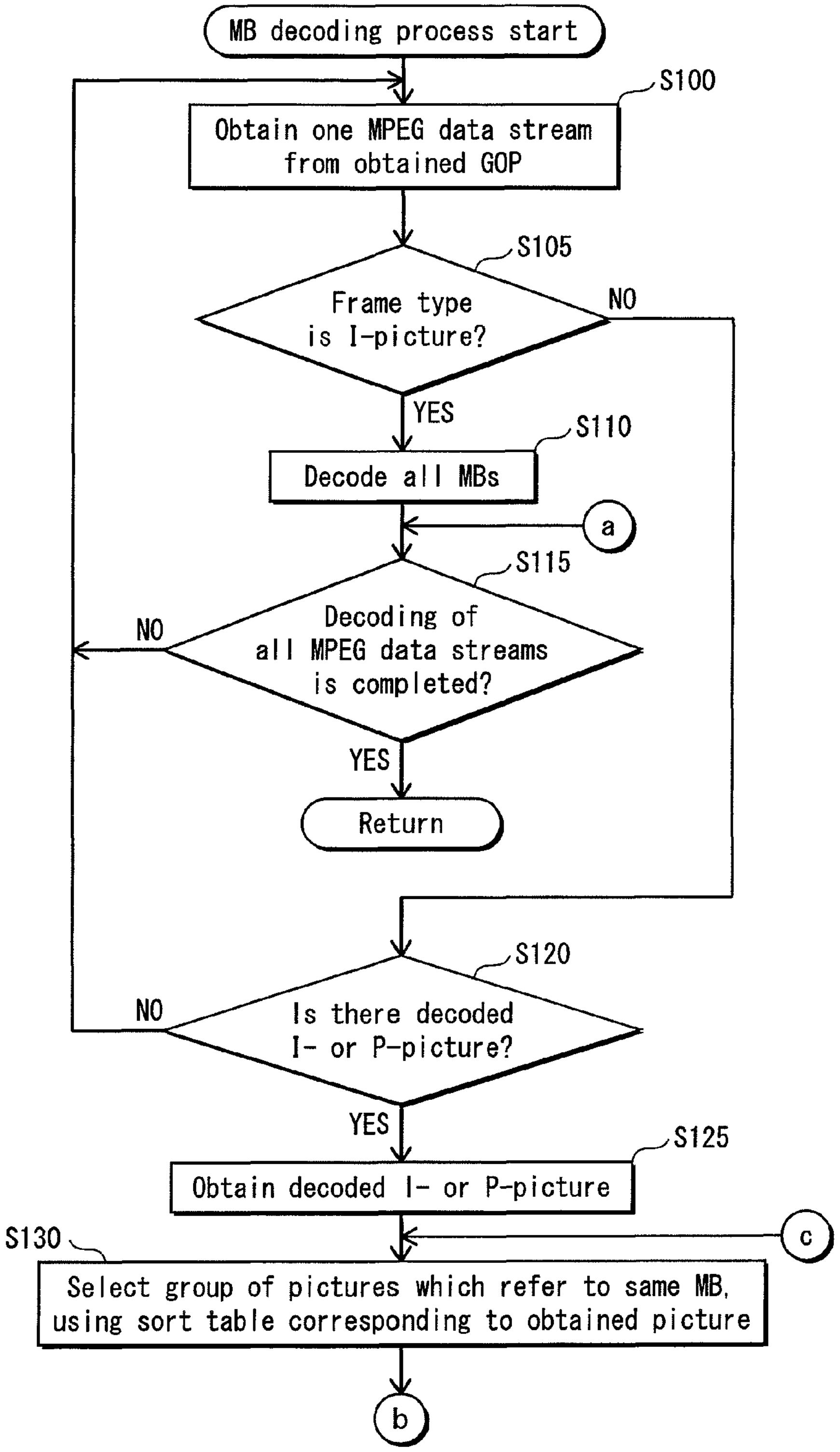
FIG. 8 is a flowchart showing the operation of the MB decoding process, continued to FIG. 9.
Figure 9:
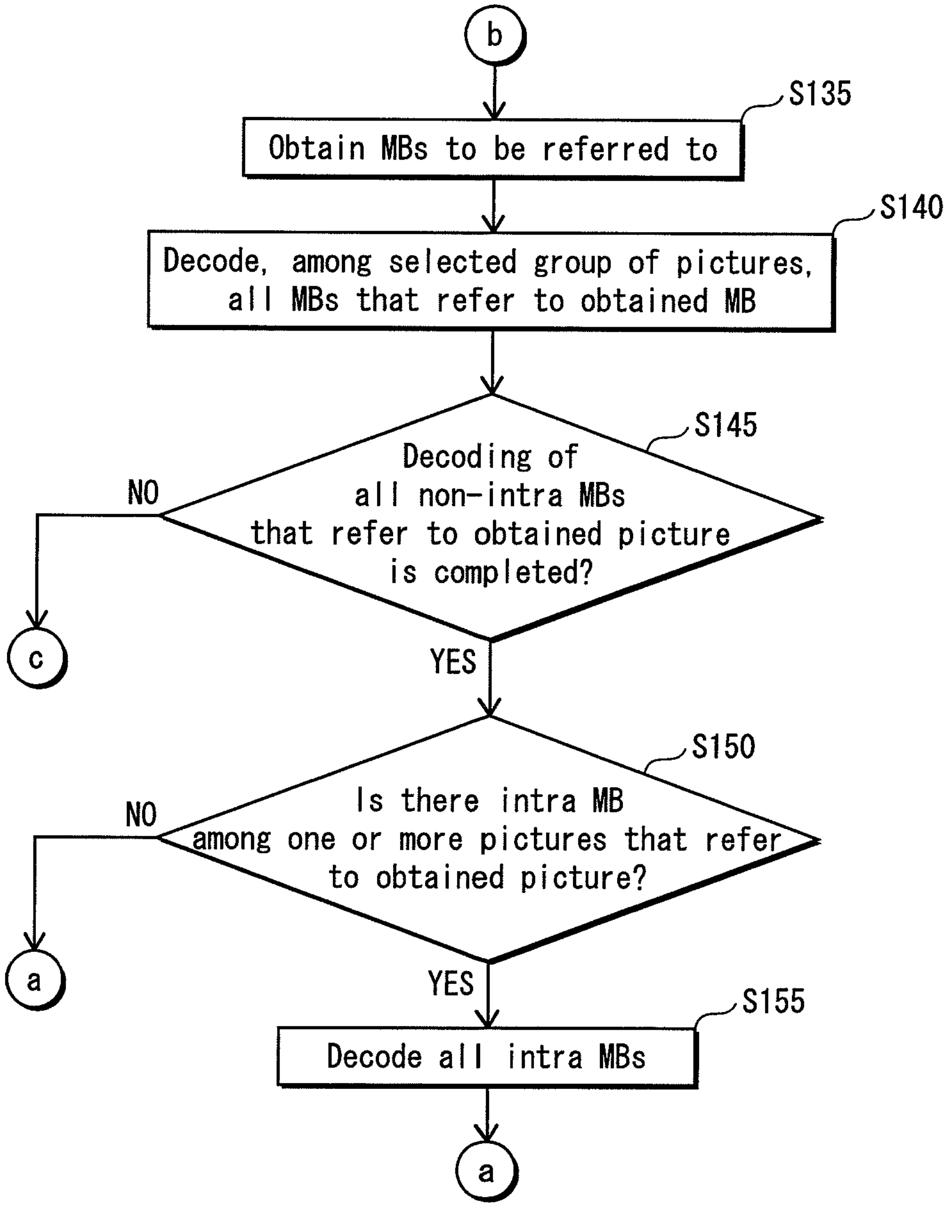
FIG. 9 is a flowchart showing the operation of the MB decoding process, continued from FIG. 8.

Here, the MB decoding process which is performed in step S40 of FIG. 7 will be described with reference to the flowcharts shown in FIGS. 8 and 9.

The decoding process control unit 250, upon receiving the decode instruction from the sort process unit 203, obtains one MPEG data stream from a GOP stored in the main memory 30 (step S100), and judges whether or not the frame type of the obtained MPEG data stream is I-picture (step S105).

When it judges that the obtained MPEG data stream is I-picture (YES in step S105), the decoding process control unit 250 sends the I-picture decoding instruction to the MB decoding process unit 253. The MB decoding process unit 253, upon receiving the I-picture decoding instruction from the decoding process control unit 250, decodes all macro blocks that respectively correspond to the pieces of macro block information included in the MPEG data streams (their frame type is I-picture) obtained by the decoding process control unit 250 (step S110).

After the decoding of the I-pictures is completed, the MB decoding process unit 253 sends the first decoding completion notification to the decoding process control unit 250. At this point in time, the decoded I-pictures (image data) have been stored in the main memory 30.

The decoding process control unit 250, upon receiving from the MB decoding process unit 253 the first decoding completion notification, judges whether or not decoding of all MPEG data streams in the GOP is completed (step S115). When it judges that decoding of all MPEG data streams is completed (YES in step S115), the decoding process control unit 250 ends the process. When it judges that decoding of all MPEG data streams in the GOP is not completed (NO in step S115), the decoding process control unit 250 returns to step S100. Note that the decoding process control unit 250 sends the GOP decoding completion notification to the GOP reading unit 201 when it ends the process.

When it judges that the obtained MPEG data stream is not I-picture (NO in step S105), the decoding process control unit 250 judges whether or not there is a decoded I-picture or P-picture that is referred to by the obtained MPEG data stream (step S120).

When it judges that there is node coded I-picture or P-picture that is referred to (NO in step S120), the decoding process control unit 250 returns to step S100.

When it judges that there is a decoded I-picture or P-picture that is referred to (YES in step S120), the decoding process control unit 250 determines a picture to be referred to, and obtains the determined reference picture (step S125).

The decoding process control unit 250 then sends the selection instruction to the picture group selection unit 251. The picture group selection unit 251 receives the selection instruction from the decoding process control unit 250. The picture group selection unit 251 selects a group of pictures which respectively refer to four macro blocks, where each set of four macro blocks referred to by the pictures includes the same macro block that has the reference position, using the sort table which, among the one or more sort tables generated by the sort process unit 203, corresponds to the reference picture obtained by the decoding process control unit 250 (step S130). For example, the picture group selection unit 251 selects the group of pictures by calculating an MBA of a macro block that includes the reference position, by using the equation for "Key", and obtaining one or more pieces of decoding process information which include MBAs that are the same as the calculated MBA.

The picture group selection unit 251, after obtaining one or more pieces of decoding process information, sends the reference MB read instruction instructing to the reference MB reading unit 252. The reference MB reading unit 252, upon receiving the reference MB read instruction from the picture group selection unit 251, reads out, from the main memory 30, four macro blocks among which there is a macro block whose MBA is identified by the value of "Key" that was used when the picture group selection unit 251 obtained one or more pieces of decoding process information, and stores the read-out four macro blocks into the cache memory 101 (step S135).

The reference MB reading unit 252 sends the MB decoding instruction to the MB decoding process unit 253. The MB decoding process unit 253, upon receiving the MB decoding instruction from the reference MB reading unit 252, sequentially decodes all the macro blocks indicated by the one or more pieces of decoding process information obtained by the picture group selection unit 251, using the four macro blocks stored in the cache memory 101, with respect to a group of pictures selected by the picture group selection unit 251 (step S140).

After it completes the decoding of the macro blocks corresponding to all the macro block information indicated in the one or more pieces of decoding process information obtained by the picture group selection unit 251, the MB decoding process unit 253 sends the third decoding completion notification to the picture group selection unit 251. The picture group selection unit 251, upon receiving the third decoding completion notification from the MB decoding process unit 253, judges whether or not there is a group of pictures that refer to another macro block in the reference picture, namely, it judges whether or not decoding of all non-intra MBs that refer to the obtained reference picture is completed (step S145).

When it judges that there is a group of pictures that refer to another macro block in the reference picture, namely, when it judges that decoding of all non-intra MBs that refer to the obtained reference picture is not completed (NO in step S145), the picture group selection unit 251 returns to step S135, obtains the group of pictures that refer to another macro block, and performs the operation onwards.

When it judges that there is no group of pictures that refer to another macro block in the reference picture, namely, when it judges that decoding of all non-intra MBs that refer to the obtained reference picture is completed (YES in step S145), the picture group selection unit 251 sends the intra MB decoding instruction to the MB decoding process unit 253. The MB decoding process unit 253, upon receiving the intra MB decoding instruction from the picture group selection unit 251, judges whether or not there is a piece of macro block information indicating an intra MB, excluding the macro block information that has been used in the decoding, in one or more MPEG data streams that refer to the reference picture obtained by the decoding process control unit 250 (step S150).

When it judges that there is a piece of macro block information indicating an intra MB (YES in step S150), the MB decoding process unit 253 decodes all the intra MBs included in the one or more MPEG data streams that refer to the reference picture (step S155).

When it judges that there is no piece of macro block information indicating an intra MB (NO in step S150), or after step S155 is executed, the MB decoding process unit 253 sends the second decoding completion notification to the decoding process control unit 250.

The decoding process control unit 250, upon receiving the second decoding completion notification from the MB decoding process unit 253, executes step S115, and performs the operation onwards.

1.3 Specific Example (1) Specific Example of Reference Relationships

Here, reference relationships between reference pictures and decoding target pictures will be described with reference to a specific example case shown in FIG. 10.

Figure 10:
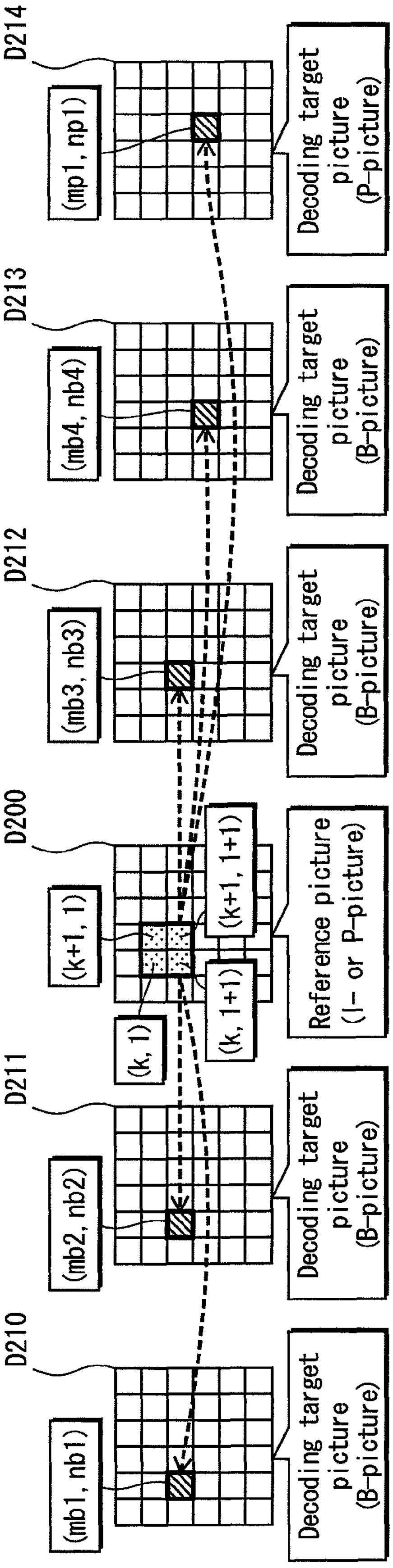
FIG. 10 shows reference relationships in the motion compensation process between pictures in the MPEG data.

As shown in FIG. 10, a picture D200 is a reference picture, and is either an I-picture or a P-picture. Pictures D210, D211, D212, and D213 are decoding target pictures, and are B-pictures. Picture D213 is a decoding target picture, and is a P-picture. By using the reference MB information obtaining unit 202 and the sort process unit 203, it is possible to obtain information that the information of areas included in four macro blocks of picture D200 whose MBAs are (k, l), (k+1 , l), (k, l+1) and (k+1, l+1) is referred to by two pictures D210 and D211 that precede picture D200 and three pictures D212, D213 and D214 that follow picture D200, and is used to decode macro blocks whose MBAs are (mb1,nb1), (mb2, nb2), (mb3,nb3), (mb4,nb4), and (mp1,np1), respectively.

As described above, the sort process unit 203 sorts reference relationships for each macro block in the GOP, focusing on the "macro blocks to be referred to". At this point in time, it is not necessary that specific values have been calculated for each macro block, but it is only necessary that the reference relationships between macro blocks have been made apparent. It is especially necessary that, for a macro block to be referred to, it is apparent which macro block of which picture refers to the value of the macro block itself.

(2) Specific Example of Decoding Process

Here, the order of decoding in the decoding process will be described with reference to a specific example case shown in FIG. 11.

Figure 11:
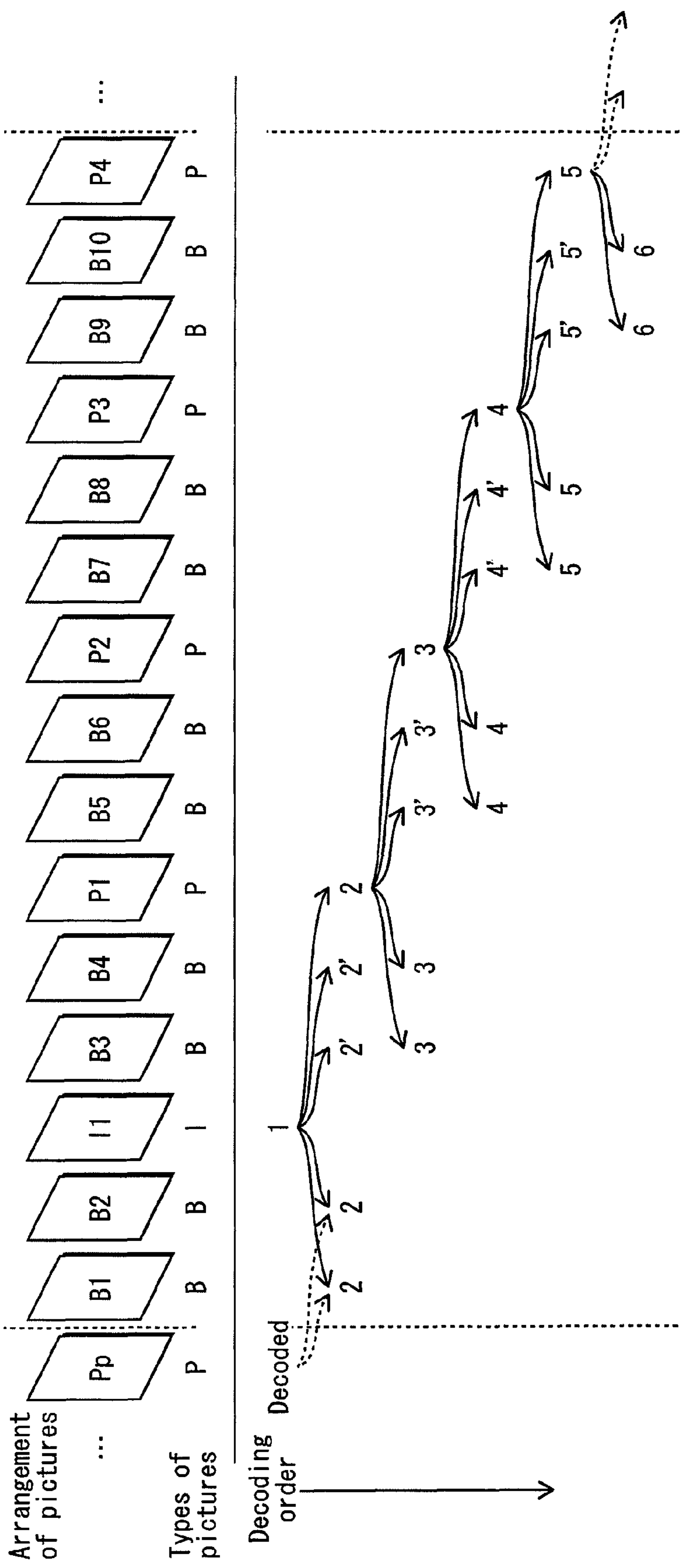
FIG. 11 shows an order of decoding MPEG data in the present invention.

FIG. 11 shows an order of decoding in the decoding process of one GOP in the present invention.

First, the I-picture (represented as I1) is decoded by the same method as a conventional one. Next, the P-picture that appears first (represented as P1) is decoded. The decoding order is also the same as a conventional one. The present invention is characterized in that the P-picture and B-pictures (represented as B3 and B4) that are decoded using information of I1 and P1 are decoded simultaneously. That is to say, when, to decode P1, the main memory is accessed to read out information of the macro block from I1 that has been decoded, it is recognized that the information of the macro block is used to decode B3 and B4 (because reference relationships between pictures and reference relationships between macro blocks have been made apparent preliminarily). Accordingly, the values of the macro block information are used to decode the macro blocks of B3 and B4 that use the information of the macro block. When the decoding process is performed in the above-described order, the same data is continuously accessed, and thus the cache hit is achieved almost certainly in the calculators provided with a cache memory. Therefore, the information of I1 that is used to decode the three pictures (P1, B3, and B4) needs to be read out only once from the main memory.

Here, there may be a case where, when a GOP that is currently subjected to the decoding process is not a closed GOP, a B-picture at the start of the GOP can be decoded by using the information of a picture that is included in a GOP that is placed immediately before (this case is shown in FIG. 11). In this case, two B-pictures (B1 and B2) at the start of the GOP and the above-mentioned three pictures (P1, B3, and B4) are decoded simultaneously. In the decoding of B1 and B2, it is possible to use information of I-picture I1 and P-picture Pp (which may be replaced with I-picture in other cases) that is included in a GOP that is placed immediately before. That is to say, five pictures in total can be decoded simultaneously. The information obtained from Pp has already been set to B1 and B2. As a result, the decoding process of B1 and B2 is completed when the information is obtained from I1. The decoding process of P1 is also completed because P1 obtains information only from I1 in the decoding process.

The decoding process of B3 and B4 cannot be completed unless the information is obtained from P1. However, P1 is currently subjected to the decoding process, and the information of P1 cannot be used in the decoding. Accordingly, information obtained from I1 is temporarily stored into the main memory, in the state of the intermediate stage of the decoding process. In FIG. 11, among the numbers indicating the decoding order, the numbers with "'" at their upper right corners indicate the state where information of merely one of the bidirectional reference pictures has been obtained.

Next, B3, B4, B5, B6, and P2 are decoded by using P1. With respect to B3 and B4, since information of I1, which is to be used in the bidirectional prediction, has already been obtained, the decoding of B3 and B4 is completed at the time of obtainment of information from P1. P2 refers to only P1. Therefore, P2 can be decoded when the information from P1 is obtained. With respect to B5 and B6 which perform the bidirectional prediction, information from P1 and P2 is necessary for the decoding thereof. However, since decoding of P2 has not been completed, only the information obtained from P1 is used in the decoding (decoding order number "3'"), as is the case with the decoding of B1, B2 and P1. In this case also, an area for performing the decoding process is determined on the basis of the macro block of P1 that is referred to, and the decoding process is performed in sequence using the area. This makes it possible to access the memory only once (since no cache error occurs), to obtain information of the macro block of P1 that is referred to and has been decoded.

After this, the above-described process is repeated for each of all pictures (namely, MPEG data streams) in the GOP. With this structure, each macro block to be referred to when a P-picture or B-picture is decoded, can be obtained with only one access to the memory (because, thereafter, the macro block can be obtained from the cache memory).

When the decoding process is completed with respect to all the pictures (MPEG data streams) in the GOP, pictures having been decoded are sequentially read out from the main memory, and are transferred to the display device. Note that, to transfer the pictures to the display device, there is no need to wait for all the pictures in the GOP to be decoded. The decoded pictures that are no longer referred to may be sequentially transferred to the display device. Also, there may be a case where processes such as a format conversion and a scan conversion are necessary to display the pictures on the display device. In that case, (typically) the CPU 100 performs these processes before the pictures are transferred to the display device.

From the above description, it should be understood that the decoding process for P1 is completed at the same time as that for B1 and B2. Note that the intra macro blocks of both the P-picture and B-picture only need to have been decoded before they are output for reference or display.

In the present invention, the decoding process is started after reference relationships between pictures and reference relationships between macro blocks are made apparent, by using the reference MB information obtaining unit 202 and the sort process unit 203. This makes it possible to continuously decode the macro blocks and the pictures for which the macro blocks having been read out to be referred to can be used in the decoding process. This further makes it possible to continuously access the same data (information having been read out to be referred to), and thus improve the cache hit rate compared with conventional methods.

(3) Specific Example of Accesses to Cache Memory 101

Here, the accesses to the cache memory 101 will be described with reference to a specific example case shown in FIGS. 12 and 13.

Figure 12:
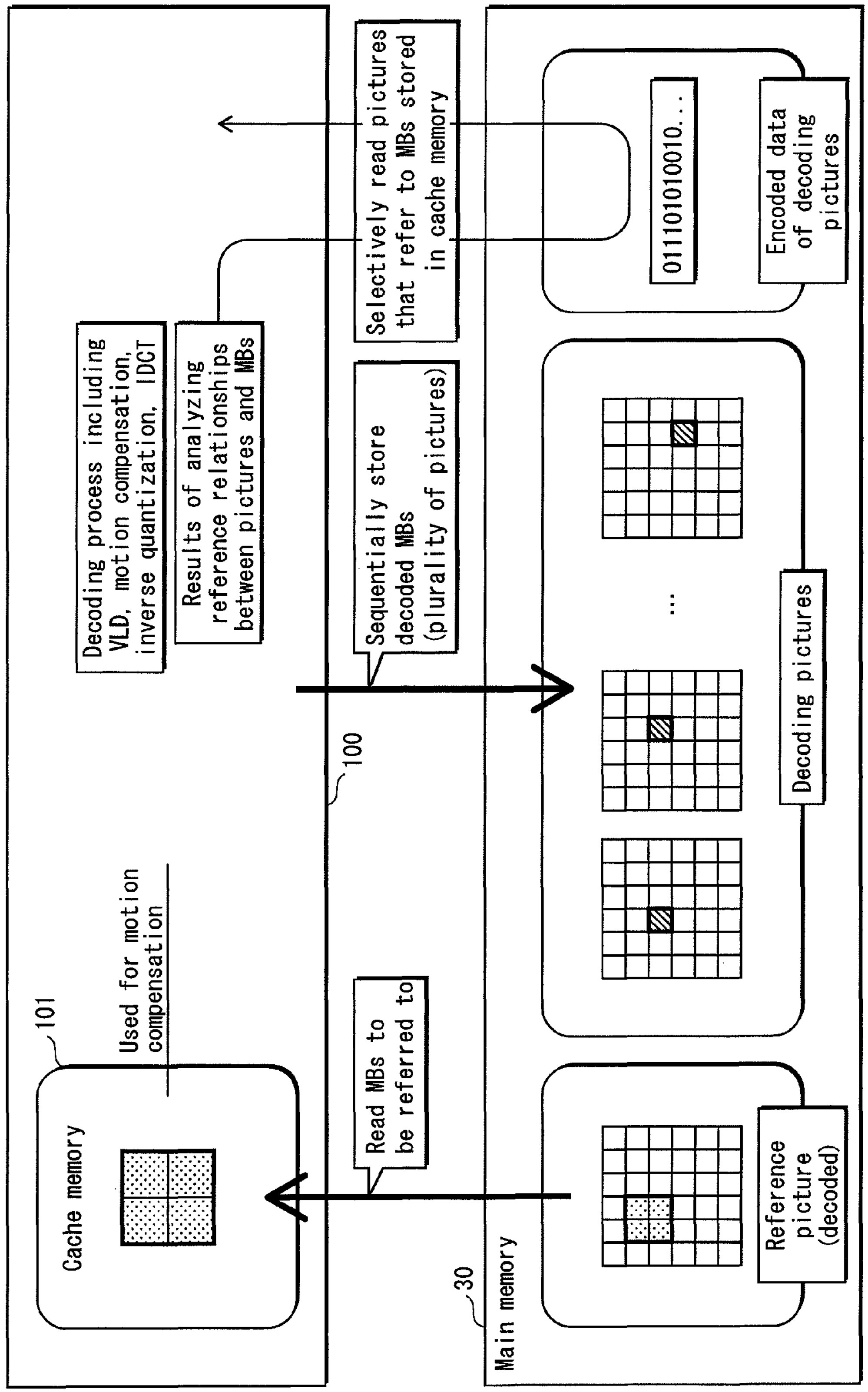
FIG. 12 shows that, after information for reference is read out from the main memory 30, the CPU 100 does not need to access the main memory 30 again to obtain the information.
Figure 13:
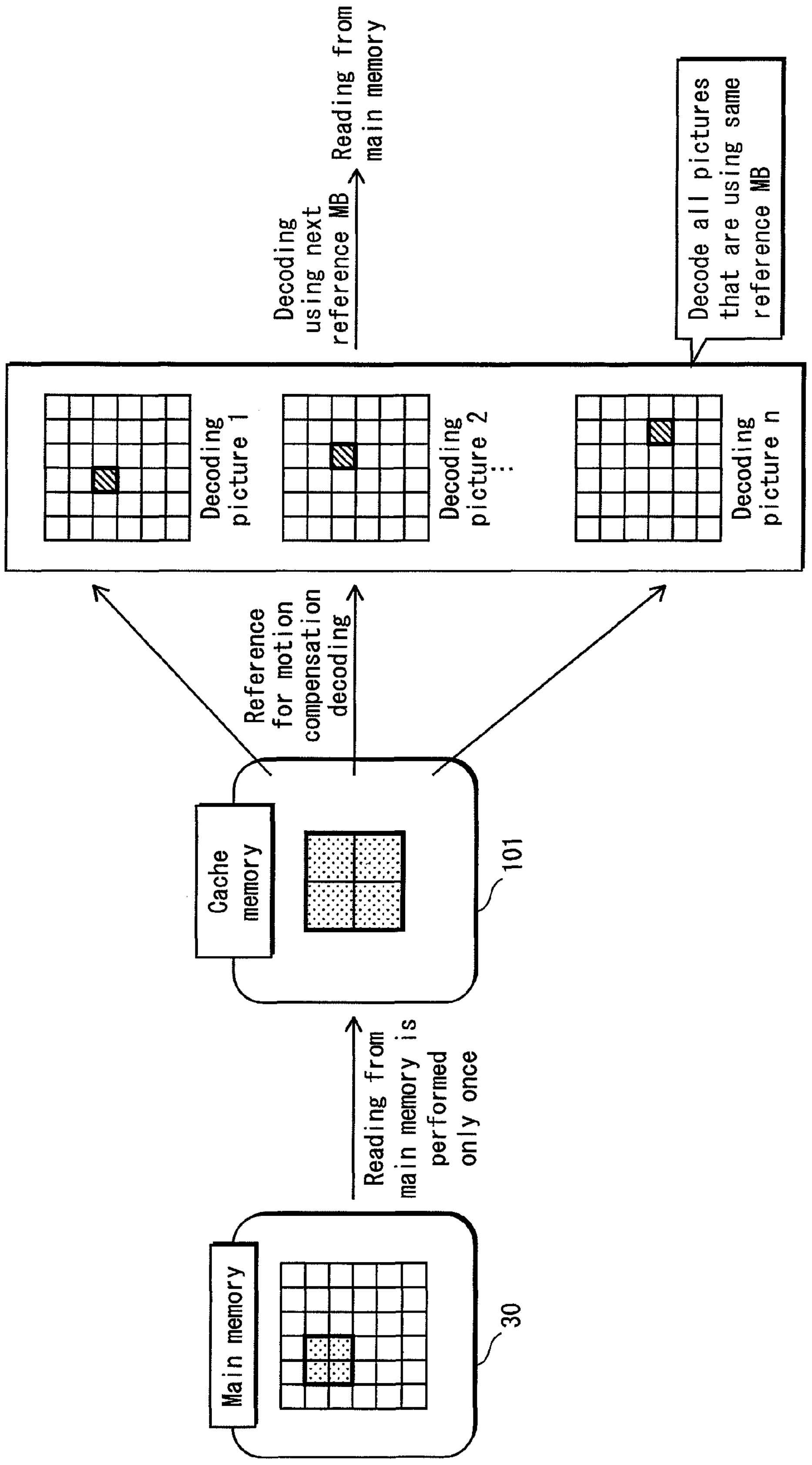
FIG. 13 shows that the information stored in the cache memory 101 can be used repeatedly.
Figure 14A:
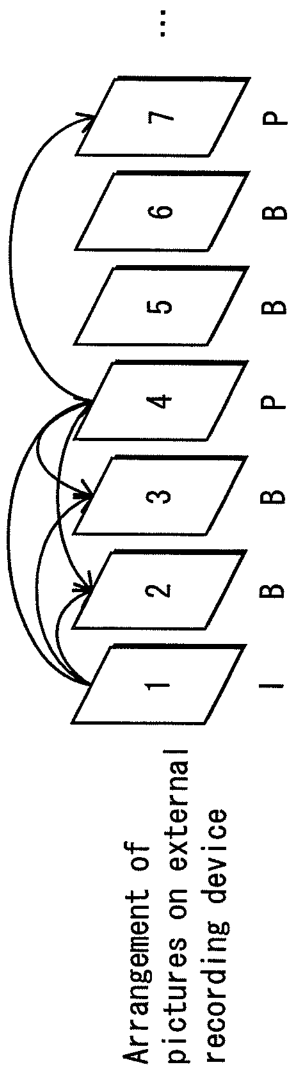
FIG. 14 shows a storage order, decoding order and output order of pictures in the MPEG2 method, in a conventional technology.
Figure 14B:
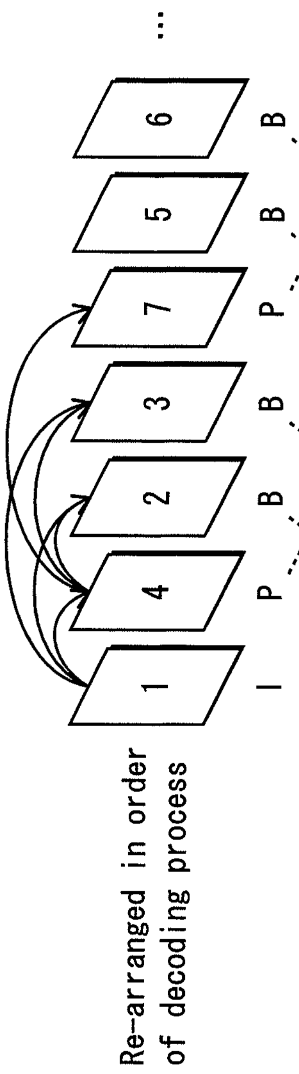
Figure 14C:
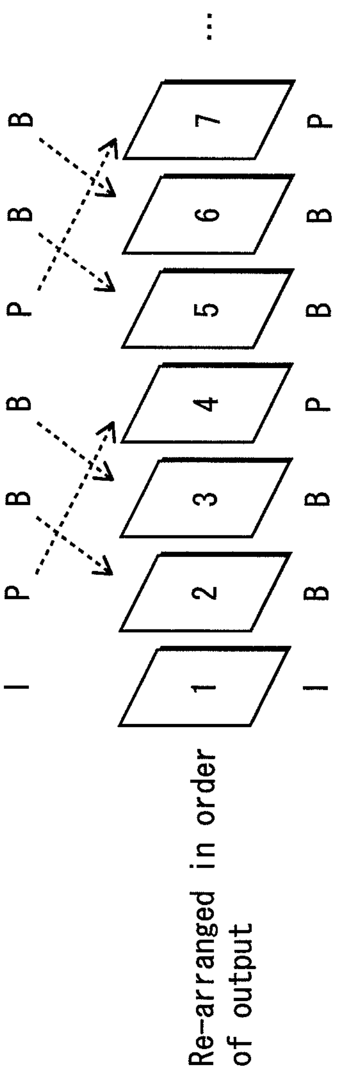

FIGS. 12 and 13 provide illustrations for explanation that, after information for reference is read out from the main memory 30, the CPU 100 does not need to access the main memory 30 again to obtain the information.

As shown in FIG. 12, a part of the reference picture (four macro blocks) is read out and stored into the cache memory 101.

At this point in time, the decoding process system 1, by using the reference MB information obtaining unit 202 and the sort process unit 203, has already obtained information indicating which macro block of which picture refers to the information having been read out from the main memory 30. Therefore, the decoding process system 1 reads out, from the main memory 30, data streams (or pictures in the middle of decoding) that correspond to the pictures and macro blocks that use the information, and decodes the read-out data streams.

Once the part of the reference picture (four macro blocks) is read out, the read-out part of the reference picture is used for each of all pictures to be referred to. It is understood from this that, once read out, the part of the reference picture is not read out again for the decoding process.

FIG. 13 provides illustrations for explanation that the information stored in the cache memory 101 can be used repeatedly, under the circumstances shown in FIG. 12.

As described above, a part of the reference picture (four macro blocks) is read out and stored into the cache memory 101.

At this point in time, the decoding process system 1, by using the reference MB information obtaining unit 202 and the sort process unit 203, has already obtained information indicating which macro block of which picture refers to the information having been read out from the main memory 30. Therefore, the decoding process system 1 reads out, from the main memory 30, data streams or pictures in the middle of decoding (in this example, decoding pictures 1, 2, . . . , n) that correspond to the pictures and macro blocks that use the information. The decoding process system 1 then decodes the decoding pictures 1, 2, . . . , n that were read out from the main memory 30, by using the four macro blocks stored in the cache memory 101.

Note that in FIGS. 12 and 13, a plurality of pieces of reference data that are used by macro blocks in the middle of decoding in the decoding target picture do not match each other, but they should be information that can be extracted from information corresponding to the four macro blocks stored in the cache memory.

1.4 Modifications

Up to now, the present invention has been described through an embodiment thereof. However, the present invention is not limited to the embodiment, but includes, for example, the following modifications.

(1) The concept of the "reference block image" of the present invention may include a set of four macro blocks which include a macro block that includes the reference position.

Alternatively, the reference block image may be composed of one macro block. That is to say, the reference block image may be composed of one or more macro blocks.

(2) In the above-described Embodiment 1, after the decoding process information is obtained, four macro blocks to be used for reference during decoding are read into a cache memory. However, the present invention is not limited to this structure.

The decoding process unit may read four macro blocks to be used for reference during decoding into a cache memory, before the decoding process information is obtained.

In this case, the decoding process unit obtains decoding process information that indicates that the four macro blocks stored in the cache memory should be referred to.

(3) In the above-described Embodiment 1, the number of macro blocks to be used for reference during decoding is four, namely, the number of macro blocks to be read into the cache memory is four. However, the present invention is not limited to this structure.

The number of macro blocks to be used for reference during decoding may be any number as far as the number covers the size of the block to be identified by the motion vector.

In the above-described Embodiment 1, the size of the block to be identified by the motion vector is 16 pixels×16 pixels, which is the same as the size of a regular macro block. This indicates that "four" as the number of macro blocks to be used for reference during decoding is sufficient to include the block to be identified by the motion vector.

(4) In the above-described Embodiment 1, intra macro blocks are decoded after non-intra macro blocks included in P-pictures and B-pictures are decoded. However, the present invention is not limited to this structure.

Intra macro blocks may be decoded first, and then non-intra macro blocks may be decoded.

(5) The present invention is also effective in the case where a plurality of compressed data streams are decoded in parallel. Basically, it is possible to increase the efficiency of accessing the main memory to the maximum, by adopting the method in which data streams are stored into the main memory in units of GOPs which constitute the data streams, and then, after the data (pictures) whose reference relationship is closed has been decoded, the next GOP (the GOP may be a GOP in the current data stream or a GOP in another data stream) is started to be decoded. The present application does not recite from which data stream, GOPs should be read into the main memory so as to be subjected to the decoding process. However, the data streams may be read and decoded in any order as far as the playback can be performed naturally when the frame rate, compression rate and the like of each data stream are used as the parameters.

(6) Embodiment 1 is described on the presumption that the number of GOPs to be stored into the main memory is one, for the sake of convenience. However, depending on the capacity of the main memory, a plurality of GOPs may be stored into the main memory and processed in parallel (or processed in time-division virtually in parallel). This method is effective for dealing with a plurality of data streams simultaneously.

(7) In the above-described Embodiment 1, data streams generated by compressing moving images in compliance with the MPEG format are used. However, the present invention is not limited to this structure. The data streams to be used may be generated by compressing moving images in compliance with the MPEG-2/4 or H.264.

Also, the data that the present invention can deal with is not limited to moving images. The present invention also can deal with data streams having reference relationships between groups of certain types of data that correspond to pictures in the moving images (for example, audio data).

(8) In the above-described Embodiment 1, the decoding process system 1 includes the decoding semiconductor device 10, external storage device 20, main memory 30, and display device 40. However, the present invention is not limited to this structure.

The decoding process system 1 may additionally include an input device which receives MPEG data streams from an external device and stores the received MPEG data streams into the external storage device 20.

(9) The above-described Embodiment 1 provides one example of the operation of the picture group selection unit 251 in which the picture group selection unit 251 selects the group of pictures by calculating an MBA of a macro block that includes the reference position, by using the equation for "Key", and obtaining one or more pieces of decoding process information which include MBAs that are the same as the calculated MBA. However, the present invention is not limited to this structure.

The picture group selection unit 251 may schedule the order of reading out the decoding target pictures so as to continuously decode the blocks by the motion compensation by referring to a same reference block group (four macro blocks to be stored in the cache memory).

For example, the reading order may be determined based on the order of playing back the decoding target pictures.

In this case, the MB decoding process unit 253 decodes macro blocks based on the scheduled order.

(10) The decoding process system described in Embodiment 1 may be, for example, a decoding process device for decoding compress-encoded moving images and playing back the decoded moving images. More specifically, the decoding process device may be, for example, a digital television or a DVD player.

In this case, the decoding semiconductor device described in Embodiment 1 is included in the decoding process device.

(11) In the above-described Embodiment 1, the process of decoding MPEG data streams is executed by software. However, the present invention is not limited to this structure.

The process of decoding MPEG data streams may be executed by a dedicated hardware device.

Also, operations of the GOP reading unit, reference MB information obtaining unit, sort process unit, and decoding process unit may be performed by a dedicated hardware device. Further, a part of operations of these constitutional elements may be performed by a dedicated hardware device.

(12) In the above-described Embodiment 1, the decoding process information includes values of the X and Y coordinates. However, the present invention is not limited to this structure.

The decoding process information may include a macro block address which is indicated by the X and Y coordinates, instead of values of the X and Y coordinates.

In this case, the macro block address may be calculated when the reference position table or the sort table is generated.

Further, the reference position indicated by the motion vector may be represented by the macro block address instead of the X and Y coordinates.

Still further, the information of the reference position may include both the macro block address and values of the X and Y coordinates.

(12) The present invention may be methods shown by the above. The present invention may be a computer program that allows a computer to realize the methods, or may be a digital signal representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the digital signal recorded on any of the aforementioned recording mediums.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(13) Part or all of the structural elements constituting the devices (the decoding semiconductor device, the decoding device or the like) described above may be achieved in one system LSI (Large Scale Integration). The system LSI is an ultra multi-functional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

Each part of structural elements constituting each of the above-described devices (the decoding semiconductor device, the decoding device or the like) may be achieved on one chip, or part or all thereof may be achieved on one chip.

Although the term LSI is used here, it may be called IC, LSI, super LSI, ultra LSI or the like, depending on the level of integration. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(14) The present invention may be any combination of the above-described embodiments and modifications.

1.5 Summary

In CPUs currently used on general purposes, for example, the primary cache that is provided inside the CPU has a capacity of several tens of kilobytes, and the secondary cache that is provided outside the CPU has a capacity of up to two megabytes. In general, cache memories of the CPU or microcomputer provided in a device for consumers have capacities smaller than the above-described ones: the primary cache has a capacity of several tens of kilobytes; and the secondary cache has a capacity of several hundreds of kilobytes. Meanwhile, in the case of the image data (having been decoded) to be processed in compliance with the MPEG, one picture, which has been compressed in compliance with a typical MPEG-2 profile, has approximately 700 KB. This indicates that the secondary cache can store one to several pictures. However, with respect to the high-definition images that are expected to become popular in future, there might be a case where a cache memory cannot store even one picture. Also, as described earlier, at least two decoded pictures are required to decode a B-picture. In that case, when a piece of image data is stored in a cache memory, it is necessary to access the main memory to obtain another picture, and thus the processing speed of the decoding process as a whole cannot be improved by conventional methods.

On the other hand, according to the method of the decoding process of the present invention, data streams corresponding to the pictures or macro blocks that refer to the information stored in a cache memory are selectively read out from the main memory, and are decoded. With this structure, the information to be referred has already been stored in the cache memory, and is accessed continuously. This eliminates the necessity for accessing the main memory a plurality of times to obtain the same data. Therefore, the method of the decoding process of the present invention improves the processing speed of the decoding process as a whole.

Also, in the case of a conventional decoding process where the decoding process is performed for each picture, when a picture (for example, a B-picture) is to be decoded after another picture (for example, a P-picture) is decoded by referring to an I-picture, it is necessary to access the main memory again to obtain the same reference picture (the I-picture). The time required for the access is typically several times to several tens of times the time that is required for accessing the cache memory to obtain the data. Further, when it is taken into consideration that the CPU cannot perform anything until the data is obtained, it could be said that the effect of the use efficiency of cache memory on the performance as a whole is extremely large.

Further, the technology disclosed in Patent Document 1 is applicable only to consecutive B-pictures, and thus cannot be used to decode P-pictures that also require the motion compensation process. Further, since the technology of Patent Document 1 is aimed to restrict occurrence of a cache error in the process of decoding a set of consecutive B-pictures, it is difficult to re-use the data stored in the cache memory when a plurality of sets of B-pictures that are located before and after the picture to be referred to are processed. The conventional technology thus has a limit in improving the cache hit rate. Further, in methods with growing popularity such as H.264/AVC that use long GOPs, the freedom for setting the reference data for motion compensation has been greatly expanded. Therefore, the technology of Patent Document 1 may not necessarily improve the cache hit rate.

On the other hand, the present invention enables the cache memory to be used effectively by controlling the algorithm so that the same data is accessed continuously, and thus improve the use efficiency of cache memory and improve the performance of the decoding process as a whole.

Also, the present invention restricts the occurrence of a cache error during the process of decoding the MPEG data, and reduces the number of accesses to the main memory, thereby enabling the decoding process to be performed at a higher speed.

In conventional technologies, the decoding process is performed on a picture (B- or P-picture) that is decoded by referring to another picture, until decoding of the picture is completed. On the other hand, in the present invention, a plurality of pictures (B- or P-picture) that are decoded by referring to a reference picture, are decoded as the decoding process is performed alternately onto the plurality of pictures (B- or P-picture), not as the decoding process is performed for each picture.

The present invention has the following characteristics, as well.

(1) One aspect of the present invention is a moving image decoding method that includes a calculator and a main memory, wherein the calculator is embedded with a cache memory, and information about a motion compensation of all pictures included in a GOP stored in the main memory is prefetched before decoding of a picture included in the GOP is started.

With the above-described structure, the data read out from the main memory is used continuously by the calculator including the cache memory. This makes it possible to use the data stored in the cache memory in the calculator (cache hit), which reduces the number of accesses to the main memory, resulting in the achievement of a highly-efficient, high-speed decoding process.

(2) In the above-stated moving image decoding method of (1), the prefetched information about the motion compensation may include a reference picture and a motion vector, and an image area to be used in the motion compensation may be identified from the reference picture and the motion vector.

(3) In the above-stated moving image decoding method of (2), a size of the image area to be used in the motion compensation, and a size of an image area of the picture included in the GOP that refer to the image area to be used in the motion compensation, may be a size of a block that performs the motion compensation.

(4) In the above-stated moving image decoding method of (3), a reference block area composed of one or more blocks including the image area to be used in the motion compensation may be set, and all blocks that perform the motion compensation onto all pictures included in the GOP that refer to the reference block area may be extracted.

(5) In the above-stated moving image decoding method of (4), when a decoding process is performed onto the picture included in the GOP, decoding may be performed continuously onto the blocks that perform the motion compensation onto all pictures included in the GOP, wherein one or more block groups including the area to be used in the motion compensation are same.

(6) In the above-stated moving image decoding method of (5), a decoding process may be performed in units of GOPs alternately onto a plurality of different pieces of compressed moving image data.

(7) The above-stated moving image decoding method of (5) or (6) may further include an external storage device for storing compressed moving image data.

(8) The above-stated moving image decoding method of (5) or (6) may further include a data input device for inputting compressed moving image data streams.

(9) The above-stated moving image decoding method of (5) or (6) may further include a display device for displaying decoded moving image data.

(10) An other aspect of the present invention is a moving image decoding device, including: a decoding unit for decoding compressed moving image data; a cache memory unit embedded in the decoding unit; a main memory unit for temporarily storing the compressed moving image data, reading out data that is a target of a decoding process specified by the decoding unit, and sending the read-out data to the decoding device; and a motion compensation information pre-fetch unit for extracting a reference picture and a motion vector as information about a motion compensation of all pictures included in a GOP stored in the main memory unit.

(11) The above-stated moving image decoding device of (10) may further include a reference relationships sort unit for identifying a reference image area whose size is equivalent with a size of a block that performs a motion compensation, from the reference picture and the motion vector, and extracting all blocks that perform the motion compensation onto all pictures included in the GOP that refer to the reference block area that is composed of one or more blocks including the reference image area.

(12) The above-stated moving image decoding device of (11) may further include a scheduling unit for scheduling an order of reading out the compressed moving image data from the main memory so as to continuously decode the blocks that perform the motion compensation onto all pictures included in the GOP that refer to the same reference block area, in the decoding process to be performed by the decoding unit, in accordance with a result of the extraction performed by the reference relationships sort unit.

The present invention can be used effectively, namely repetitively and continuously, in the industry for manufacturing and selling the decoding semiconductor devices that decode compressed moving images.

Also, the decoding semiconductor device of the present invention is useful as a digital television, a digital video player or the like which is used to view AV contents compressed in compliance with MPEG format. The present invention is also applicable to one-segment broadcast receivers in mobile devices or the like.

The invention claimed is:

1. A decoding device for decoding an encoded sequence generated by predictive encoding a plurality of frame images, wherein the encoded sequence is composed of a plurality of encoded frame images, each of the encoded frame images includes a plurality of encoded pixel blocks, at least part of the encoded plurality of pixel blocks is generated by predictive encoding a pixel block that refers to a reference pixel block and includes reference relationships information that indicates that the pixel block refers to the reference pixel block, and the reference relationships information includes reference frame information and reference position information which respectively indicate a reference-destination frame image and a reference position in a reference-destination reference pixel block, the decoding device comprising:

a main memory storing a plurality of decoded frame images; and a processor having a cache memory whose capacity is at least a data size of the reference pixel block and is less than a data size of the frame image, the processor, by executing an application program, operating as:

an obtaining unit operable to obtain the encoded sequence;

an extracting unit operable to extract a plurality of pieces of reference relationships information from the obtained encoded sequence;

an identifying unit operable to select one frame image among a plurality of reference-destination frame images that are indicated by a plurality of pieces of reference frame information included in the extracted plurality of pieces of reference relationships information, extract a plurality of pieces of reference position information respectively from all of a plurality of pieces of reference relationships information including a plurality of pieces of reference frame information that indicate the selected frame image as the reference-destination frame image, generate a reference list that is composed of the extracted plurality of pieces of reference position information, and identify, from the generated reference list, all reference-source encoded pixel blocks that refer to a same reference pixel block, for each of a plurality of reference pixel blocks included in the selected frame image;

a storing unit operable to read out one reference pixel block included in the reference-destination frame image from the main memory, and store the read-out reference pixel block into the cache memory; and a decoding unit operable to determine, using the reference list, all encoded pixel blocks that refer to the reference pixel block while the reference pixel block itself is stored in the cache memory without being discarded, and decode all the determined encoded pixel blocks, wherein the identifying unit, when identifying all the reference-source encoded pixel blocks, calculates Macro Block Address (MBA) values based on reference positions respectively indicated by all the plurality of pieces of reference position information included in the generated reference list, and identifies all pieces of reference position information from which the same MBA value is calculated, the MBA values indicating positions of reference pixel blocks to be referred to, and further re-arranges the plurality of pieces of reference position information included in the reference list so that all the pieces of reference position information from which the same MBA value is calculated continuously appear in the reference list, and the decoding unit decodes all the determined encoded pixel blocks in an order of the pieces of reference position information arranged in the reference list after the re-arrangement thereof.

2. The decoding device of claim 1, wherein the identifying unit generates the reference list in which (i) encoded frame images each of which includes an encoded pixel block having a different one of the extracted pieces of reference position information, are associated with (ii) a plurality of pieces of decoding position information that respectively indicate positions of encoded pixel blocks included in the encoded frame images of (i), obtains, from the generated reference list, all the pieces of reference position information that indicate that the reference areas are within the reference pixel blocks, and identifies all the encoded pixel blocks by identifying a plurality of pieces of decoding position information that are respectively associated with all the obtained pieces of reference position information.

3. The decoding device of claim 2, wherein the decoding unit identifies, using the reference list, a plurality of pieces of decoding position information that are respectively associated with all the pieces of reference position information that refer to the reference pixel block, and thereby determines all the encoded pixel blocks that refer to the reference pixel block.

4. The decoding device of claim 2, wherein the identifying unit repeats identifying all the encoded pixel blocks that refer to the reference pixel block, for each of all reference pixel blocks included in the frame image.

5. The decoding device of claim 2, wherein the identifying unit calculates block numbers of reference pixel blocks that include reference areas identified by reference positions that are indicated by all the pieces of reference position information included in the reference list, and re-arranges pairs of a piece of reference position information and a piece of decoding position information, in order of the calculated block numbers.

6. The decoding device of claim 5, wherein the reference position is composed of first position information and second position information, the first position information indicating a position on a first axis for a frame image, the second position information indicating a position on a second axis that is perpendicular with the first axis, the identifying unit calculates, from a coordinate point indicated by a first coordinate and a second coordinate, the block numbers of reference pixel blocks that includes the coordinate point.

7. The decoding device of claim 1, wherein each of the encoded pixel blocks includes playback information which indicates an order of playback to be performed, and the identifying unit performs the re-arranging of the pieces of reference position information in the reference list by re-arranging all the pieces of reference position information, which indicate that reference areas are included in the same reference pixel block, so that all the pieces of reference position information are arranged in the order of playback indicated by the playback information, and the decoding unit sequentially decodes all the identified encoded pixel blocks in accordance with the order of playback indicated by the playback information, based on the reference list.

8. The decoding device of claim 1, further comprising:

a control unit operable to control operations of the storing unit and the decoding unit to be repeated for each of the plurality of encoded pixel blocks identified by the identifying unit, wherein the storing unit, after the decoding unit decodes all the encoded pixel blocks identified by the identifying unit as referring to the same reference pixel block, obtains another reference pixel block from the one frame image, under control of the control unit, the decoding unit, after decoding all the encoded pixel blocks, decodes all encoded pixel blocks that refer to the another reference pixel block, under control of the control unit, and the control unit controls operations of the storing unit and the decoding unit to be repeated, until all reference pixel blocks included in the frame image are used.

9. The decoding device of claim 8, wherein the encoded sequence includes (i) at least one intra encoded frame image that was encoded without referring to another frame image, and (ii) a plurality of non-intra encoded frame images that were encoded by referring to another frame image, the decoding unit, as a first decoding process for the encoded sequence, generates a frame image by decoding an intra encoded frame image, and the storing unit, the decoding unit, and the control unit, as a first decoding performed on the plurality of non-intra encoded frame images, decode all non-intra encoded frame images that refer to the frame image.

10. The decoding device of claim 9, further comprising:

a main memory, wherein the obtaining unit stores the obtained encoded sequence into the main memory, the decoding unit decodes an encoded pixel block, and stores a result of the decoding into the main memory, and the storing unit reads out the reference pixel block from the main memory.

11. The decoding device of claim 1, wherein the cache memory, the obtaining unit, the extracting unit, the identifying unit, the storing unit, and the decoding unit constitute a decoding semiconductor device.

12. A decoding method for use in a decoding device for decoding an encoded sequence generated by predictive encoding a plurality of frame images, wherein the encoded sequence is composed of a plurality of encoded frame images, each of the encoded frame images includes a plurality of encoded pixel blocks, at least part of the encoded plurality of pixel blocks is generated by predictive encoding a pixel block that refers to a reference pixel block and includes reference relationships information that indicates that the pixel block refers to the reference pixel block, and the reference relationships information includes reference frame information and reference position information which respectively indicate a reference-destination frame image and a reference position in a reference-destination reference pixel block, the decoding device comprising:

a main memory storing a plurality of decoded frame images; and a cache memory whose capacity is at least a data size of the reference pixel block and is less than a data size of the frame image, the decoding method comprising:

obtaining the encoded sequence;

extracting a plurality of pieces of reference relationships information from the obtained encoded sequence;

selecting one frame image among a plurality of reference-destination frame images that are indicated by a plurality of pieces of reference frame information included in the extracted plurality of pieces of reference relationships information, extracting a plurality of pieces of reference position information from a plurality of pieces of reference relationships information including a plurality of pieces of reference frame information that indicate the selected frame image as the reference-destination frame image, generating a reference list that is composed of the extracted plurality of pieces of reference position information, and identifying all reference-source encoded pixel blocks that refer to a same reference pixel block, for each of a plurality of reference pixel block included in the selected frame image;

reading out one reference pixel block from the reference-destination frame image, and storing the read-out reference pixel block into the cache memory; and determining, using the reference list, all encoded pixel blocks that refer to the reference pixel block while the reference pixel block itself is stored in the cache memory without being discarded, and decoding all the determined encoded pixel blocks, wherein the identifying step, when identifying all the reference-source encoded pixel blocks, calculates Macro Block Address (MBA) values based on reference positions respectively indicated by all the plurality of pieces of reference position information included in the generated reference list, and identifies all pieces of reference position information from which the same MBA value is calculated, the MBA values indicating positions of reference pixel blocks to be referred to, and further re-arranges the plurality of pieces of reference position information included in the reference list so that all the pieces of reference position information from which the same MBA value is calculated continuously appear in the reference list, and the decoding step decodes all the determined encoded pixel blocks in an order of the pieces of reference position information arranged in the reference list after the rearrangement thereof.

13. A non-transitory computer-readable recording medium storing a program for use in a decoding device for decoding an encoded sequence generated by predictive encoding a plurality of frame images, wherein in the program, the encoded sequence is composed of a plurality of encoded frame images, each of the encoded frame images includes a plurality of encoded pixel blocks, at least part of the encoded plurality of pixel blocks is generated by predictive encoding a pixel block that refers to a reference pixel block and includes reference relationships information that indicates that the pixel block refers to the reference pixel block, and the reference relationships information includes reference frame information and reference position information which respectively indicate a reference-destination frame image and a reference position in a reference-destination reference pixel block, the decoding device comprising:

a main memory storing a plurality of decoded frame images; and a cache memory whose capacity is at least a data size of the reference pixel block and is less than a data size of the frame image, the program causing the decoding device to perform steps comprising:

obtaining the encoded sequence;

extracting a plurality of pieces of reference relationships information from the obtained encoded sequence;

selecting one frame image among a plurality of reference-destination frame images that are indicated by a plurality of pieces of reference frame information included in the extracted plurality of pieces of reference relationships information, extracting a plurality of pieces of reference position information from a plurality of pieces of reference relationships information including a plurality of pieces of reference frame information that indicate the selected frame image as the reference-destination frame image, generating a reference list that is composed of the extracted plurality of pieces of reference position information, and identifying all reference-source encoded pixel blocks that refer to a same reference pixel blocks, for each of a plurality of reference pixel blocks included in the selected frame image;

reading out one reference pixel block from the reference-destination frame image, and storing the read-out reference pixel block into the cache memory; and determining, using the reference list, all encoded pixel blocks that refer to the reference pixel block while the reference pixel block itself is stored in the cache memory without being discarded, and decoding all the determined encoded pixel blocks, wherein the identifying step, when identifying all the reference-source encoded pixel blocks, calculates Macro Block Address (MBA) values based on reference positions respectively indicated by all the plurality of pieces of reference position information included in the generated reference list, and identifies all pieces of reference position information from which the same MBA value is calculated, the MBA values indicating positions of reference pixel blocks to be referred to, and further re-arranges the plurality of pieces of reference position information included in the reference list so that all the pieces of reference position information from which the same MBA value is calculated continuously appear in the reference list, and the decoding step decodes all the determined encoded pixel blocks in an order of the pieces of reference position information arranged in the reference list after the re-arrangement thereof.

14. An integrated circuit for a decoding device for decoding an encoded sequence generated by predictive encoding a plurality of frame images, wherein the encoded sequence is composed of a plurality of encoded frame images, each of the encoded frame images includes a plurality of encoded pixel blocks, at least part of the encoded plurality of pixel blocks is generated by predictive encoding a pixel block that refers to a reference pixel block and includes reference relationships information that indicates that the pixel block refers to the reference pixel block, and the reference relationships information includes reference frame information and reference position information which respectively indicate a reference-destination frame image and a reference position in a reference-destination reference pixel block, the integrated circuit comprising:

a main memory storing a plurality of decoded frame images; and a cache memory whose capacity is at least a data size of the reference pixel block and is less than a data size of the frame image, an obtaining unit operable to obtain the encoded sequence;

an extracting unit operable to extract a plurality of pieces of reference relationships information from the obtained encoded sequence;

an identifying unit operable to select one frame image among a plurality of reference-destination frame images that are indicated by a plurality of pieces of reference frame information included in the extracted plurality of pieces of reference relationships information, extract a plurality of pieces of reference position information respectively from all of a plurality of pieces of reference relationships information including a plurality of pieces of reference frame information that indicate the selected frame image as the reference-destination frame image, generate a reference list that is composed of the extracted plurality of pieces of reference position information, and identify, from the generated reference list, all reference-source encoded pixel blocks that refer to a same reference pixel block, for each of a plurality of reference pixel blocks included in the selected frame image;

a storing unit operable to read out one reference pixel block included in the reference-destination frame image from the main memory, and store the read-out reference pixel block into the cache memory; and a decoding unit operable to determine, using the reference list, all encoded pixel blocks that refer to the reference pixel block while the reference pixel block itself is stored in the cache memory without being discarded, and decode all the determined encoded pixel blocks, wherein the identifying unit, when identifying all the reference-source encoded pixel blocks, calculates Macro Block Address (MBA) values based on reference positions respectively indicated by all the plurality of pieces of reference position information included in the generated reference list, and identifies all pieces of reference position information from which the same MBA value is calculated, the MBA values indicating positions of reference pixel blocks to be referred to, and further re-arranges the plurality of pieces of reference position information included in the reference list so that all the pieces of reference position information from which the same MBA value is calculated continuously appear in the reference list, and the decoding unit decodes all the determined encoded pixel blocks in an order of the pieces of reference position information arranged in the reference list after the re-arrangement thereof.

* * * * *